United States Patent
Li et al.

(10) Patent No.: US 12,212,396 B2
(45) Date of Patent: Jan. 28, 2025

(54) BEAM INDICATION METHOD, DEVICE, TERMINAL AND NETWORK SIDE DEVICE

(71) Applicant: DATANG MOBILE COMMUNICATIONS EQUIPMENT CO., LTD., Beijing (CN)

(72) Inventors: Hui Li, Beijing (CN); Runhua Chen, Beijing (CN); Qiubin Gao, Beijing (CN); Yajuan Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 18/003,817

(22) PCT Filed: Jul. 1, 2021

(86) PCT No.: PCT/CN2021/104009
§ 371 (c)(1),
(2) Date: Dec. 29, 2022

(87) PCT Pub. No.: WO2022/002201
PCT Pub. Date: Jan. 6, 2022

(65) Prior Publication Data
US 2023/0261724 A1   Aug. 17, 2023

(30) Foreign Application Priority Data

Jul. 3, 2020   (CN) .......................... 202010636191.6
Jul. 17, 2020  (CN) .......................... 202010694065.6
Oct. 22, 2020  (CN) .......................... 202011138452.8

(51) Int. Cl.
*H04B 7/06*   (2006.01)
*H04L 5/00*   (2006.01)
*H04W 72/232* (2023.01)

(52) U.S. Cl.
CPC ....... *H04B 7/06968* (2023.05); *H04B 7/0639* (2013.01); *H04L 5/0053* (2013.01); *H04L 5/0096* (2013.01); *H04W 72/232* (2023.01)

(58) Field of Classification Search
CPC .... H04B 7/0695; H04B 7/088; H04B 7/0639; H04B 7/0404; H04B 7/0617;
(Continued)

(56) References Cited

U.S. PATENT DOCUMENTS 10,863,537 B2 * 12/2020  Liou .................... H04W 48/12
2019/0053212 A1  2/2019  Liu et al.
(Continued)

FOREIGN PATENT DOCUMENTS

| CN | 109150445 A | 1/2019 |
| CN | 109391948 A | 2/2019 |

(Continued)

OTHER PUBLICATIONS

First Office Action issued May 30, 2022 in Chinese Application No. 202011138452.8.

(Continued)

*Primary Examiner* — Eva Y Puente
(74) *Attorney, Agent, or Firm* — Harness, Dickey & Pierce, P.L.C.

(57) ABSTRACT

The present disclosure discloses a beam indication method, a beam indication device, a terminal and a network side device. The method is applied to a first terminal and includes: receiving, by the first terminal, a first message, wherein the first message includes beam-related information for indicating N beams, N is an integer greater than or equal to 1; transmitting, by the first terminal, at least two target channels and/or target reference signals according to the beam-related information.

18 Claims, 4 Drawing Sheets

(58) Field of Classification Search
CPC .. H04B 7/06966; H04B 7/0408; H04B 17/373; H04W 72/23; H04W 72/046; H04W 16/28; H04W 24/10; H04W 72/0446; H04W 72/21; H04W 24/08; H04W 74/0833; H04L 5/0053; H04L 5/0048; H04L 5/0023; H04L 5/0094; H04L 5/0051; H04L 5/001; H04L 5/0091; H04L 5/0044
USPC .......................................................... 375/267
See application file for complete search history.

(56) References Cited

U.S. PATENT DOCUMENTS

| | | | |
|---|---|---|---|
| 2020/0107341 A1 | 4/2020 | Zhang et al. | |
| 2020/0154474 A1 | 5/2020 | Lo et al. | |
| 2020/0187172 A1 | 6/2020 | Wang et al. | |
| 2020/0252951 A1* | 8/2020 | Frenne | H04W 72/535 |
| 2020/0287610 A1* | 9/2020 | Zhou | H04L 5/0092 |
| 2020/0295903 A1* | 9/2020 | Faxér | H04W 24/10 |
| 2020/0313747 A1* | 10/2020 | Xu | H04B 7/0617 |
| 2020/0373988 A1 | 11/2020 | Wang et al. | |
| 2021/0184733 A1 | 6/2021 | Cao | |
| 2021/0273699 A1 | 9/2021 | Cao | |
| 2021/0274503 A1* | 9/2021 | Farag | H04W 76/11 |
| 2021/0314931 A1* | 10/2021 | Farag | H04W 72/046 |
| 2021/0329624 A1 | 10/2021 | Huang et al. | |
| 2021/0337547 A1* | 10/2021 | Rahman | H04W 72/23 |
| 2021/0376908 A1 | 12/2021 | Sun et al. | |

FOREIGN PATENT DOCUMENTS

| | | |
|---|---|---|
| CN | 109392120 A | 2/2019 |
| CN | 110224802 A | 9/2019 |
| CN | 110278599 A | 9/2019 |
| CN | 110839289 A | 2/2020 |
| CN | 110958038 A | 4/2020 |
| CN | 110958693 A | 4/2020 |
| CN | 111165004 A | 5/2020 |
| EP | 3667943 A1 | 6/2020 |

OTHER PUBLICATIONS

MediaTek Inc. "DL and UL Beam Management," 3GPP TSG RAN WG1 Meeting #90bis, Rl-1718333 Oct. 9, 2017.
Ericsson, "On common beam for POSCH and PDCCH," 3GPP, Rl-1718746, Oct. 9, 2017.
Written Opinion and International Search Report issued Sep. 29, 2021 in International Application No. PCT/CN2021/104009.
Vivo, "Discussion on Enhancements on Multi-Beam Operation," 3GPP TSG RAN WGI Meeting #95 Rl-1812324, Nov. 12, 2018.
Office action issued Jan. 6, 2022 in Taiwanese Application No. 110124336.

* cited by examiner

BEAM INDICATION METHOD, DEVICE, TERMINAL AND NETWORK SIDE DEVICE

CROSS-REFERENCE TO RELATED APPLICATION

This application is the U.S. national phase of PCT Application No. PCT/CN2021/104009 filed on Jul. 1, 2021, which claims priorities of the Chinese patent application No. 202010636191.6 filed on Jul. 3, 2020, the Chinese patent application No. 202010694065.6 filed on Jul. 17, 2020, the Chinese patent application No. 202011138452.8 filed on Oct. 22, 2020, which are incorporated herein by reference in their entireties.

TECHNICAL FIELD

The present disclosure relates to the field of communications technology, in particular to a beam indication method, a beam indication device, a terminal and a network side device.

BACKGROUND

In the New Radio (NR) system, the downlink channel includes the Physical Downlink Shared Channel (PDSCH), the Physical Downlink Control Channel (PDCCH), and the uplink channel includes the Physical Uplink Shared Channel (PUSCH), and the Physical Uplink Control Channel (PUCCH).

For high-frequency transmission (FR2 frequency band in NR), due to the limited transmission range, the uplink and downlink channels are usually transmitted after beamforming to enhance coverage. The direction of the beamforming can be determined by beam scanning of the uplink and downlink reference signals, for example, the beam scanning is performed by using different directions of the Channel State Information Reference Signal (CSI-RS) or the Sounding Reference Signal (SRS), the direction of the reference signal with the best beam quality is selected for uplink or downlink transmission.

After the beams of different channels are determined, it is necessary to use a signaling to indicate the beam during channel transmission, that is, beam indication. For the PUCCH channel, the base station semi-statically configures a plurality of beams for the terminal through high-level signaling SpatialRelationInfo, and instructs to activate one of them through the Medium Access Control-Control Element (MAC-CE). For PUSCH, the uplink beam selected by the base station is indirectly indicated by the SpatialRelationInfo of the SRS resource indicated by the SRS Resource Indicator (SRI) field in the dynamic signaling downlink control information (DCI). For the PDCCH channel, the base station configures a plurality of transmission configuration indicator states (TCI state) for each control resource set (CORESET) through high-level signaling, and activates one of them through MAC-CE indication. For the PDSCH channel, the base station indicates one TCI state through the TCI field in the DCI signaling, indicating the beam of the channel.

In the solution of the related art, different channels use different beam indication signaling, and each channel performs beam indication independently, so that the different channels may use respective different beam transmissions. An important scenario in practical applications is that a plurality of channels use the same beam. For example, the PDCCH used for resource scheduling and the PDSCH for transmitting user data use the same beam for transmission; the uplink control channel PUCCH and the uplink shared channel PUSCH also use the same beam. In addition, when beam interchangeability exists, the uplink channel and downlink channel may also use the same beam. At this time, the current independent beam indication method increases system complexity and overhead of signaling indication.

SUMMARY

Embodiments of the present disclosure provide a beam indication method, a beam indication device, a terminal and a network side device, so as to reduce the complexity of the beam indication and overhead of the indication signaling, support dynamic beam indication and increase the flexibility of uplink and downlink beam control.

In a first aspect, an embodiment of the present disclosure provides a beam indication method, applied to a first terminal, and includes: receiving, by the first terminal, a first message, wherein the first message includes beam-related information for indicating N beams, N is an integer greater than or equal to 1; transmitting, by the first terminal, at least two target channels and/or target reference signals according to the beam-related information.

In some embodiment of the first aspect, the N beams are indicated by one or more of a Transmission Configuration Indicator (TCI) state, a quasi co-location (QCL) parameter, spatial relationship information (SpatialRelationInfo), an index of an uplink reference signal, an index of a downlink reference signal, an index of a synchronization signal, an uplink channel and a downlink channel.

In some embodiment of the first aspect, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

In some embodiment of the first aspect, the N beams are: beams for each of N channel signal combinations, each channel signal combination includes at least two channels and/or reference signals; or, beams of M terminals, wherein M is an integer greater than or equal to 2 and less than or equal to N.

In some embodiment of the first aspect, N is equal to 1; the transmitting, by the first terminal, at least two target channels and/or target reference signals according to the beam-related information, includes: determining only one beam indicated by the beam-related information as a first beam; determining the at least two target channels and/or target reference signals according to preconfigured information or according to combination indication information sent by a network side device and for indicating the channel signal combination; transmitting the at least two target channels and/or target reference signals based on the first beam.

In some embodiment of the first aspect, N is greater than 1; the transmitting, by the first terminal, at least two target channels and/or target reference signals according to the beam-related information, includes: when the N beams are the beams for each of the N channel signal combinations, determining a first beam of each channel signal combination according to a first corresponding relationship between the N beams and the channel signal combination, transmitting channels and/or signals in a corresponding channel signal combination based on the first beam of each channel signal combination; when the N beams are the beams of M terminals, determining a first beam of the first terminal according to a second corresponding relationship between the N beams and the terminal; determining the at least two target channels and/or target reference signals according to the preconfigured information or the combination indication information sent by the network side device and for indicating the channel signal combination; transmitting the at least two target channels and/or target reference signals based on the first beam.

In some embodiment of the first aspect, the channel signal combination is predefined, or determined by the network side device and indicated to the terminal, or determined by the terminal and fed back to the network side device.

In some embodiment of the first aspect, the channel signal combination includes at least one of the following combinations: an uplink channel and/or an uplink reference signal; a downlink channel and/or a downlink reference signal; the uplink channel and the downlink channel; the uplink channel and the downlink reference signal; the uplink reference signal and the downlink channel; the uplink reference signal and the downlink reference signal.

In some embodiment of the first aspect, the first message further includes combination indication information for indicating the channel signal combination.

In some embodiment of the first aspect, a valid time of the beam-related information in the first message is determined by at least one of the following: determining the valid time according to valid time indication information included in the first message, wherein the valid time indication information indicates a time range of the valid time, or the valid time indicates whether the beam-related information is valid; determining the valid time according to a predefined time range; determining the valid time according to configuration on the network side device; wherein the step of transmitting at least two target channels and/or target reference signals according to the beam-related information is performed only when the beam-related information is valid or when a current time belongs to the valid time.

In some embodiment of the first aspect, the predefined time range includes at least one of the following: the predefined time range is a time for transmitting the at least two target channels and/or target reference signals once, and the beam-related information is only valid within the time for transmitting the at least two target channels and/or target reference signals once; the predefined time range is a duration of the valid time predefined by a system.

In some embodiment of the first aspect, the method further includes: obtaining a method of determining the valid time according to the configuration on the network side.

In some embodiment of the first aspect, the method of determining the valid time is indicated by the first message.

In some embodiment of the first aspect, the method further includes at least one of the following: receiving, by the first terminal, a second message, wherein the second message includes combination indication information for indicating the channel signal combination; receiving, by the first terminal, a third message, wherein the third message includes beam valid indication information for indicating whether the channel signal combination uses the beam in the beam-related information, or includes time indication information for indicating a valid time of a beam using the beam in the beam-related information; the valid time of the beam in the beam-related information used by the channel signal combination is predefined or configured by the network side device; wherein the step of transmitting at least two target channels and/or target reference signals according to the beam-related information is performed only when the beam valid indication information is valid or a current time belongs to the valid time.

In some embodiment of the first aspect, the at least two channels and/or reference signals are at least two of physical downlink control channel (PDCCH), physical uplink shared channel (PUSCH), channel state information reference signal (CSI-RS) and sounding reference signal (SRS).

In some embodiment of the first aspect, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling; wherein when the first message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the first message.

In some embodiment of the first aspect, when the first message is indicated by one of UE group common DCI, DCI format 0-1, DCI format 0-2, DCI format 1-0, DCI format 1-1 and dedicated physical layer dynamic signaling, the method further includes: feeding back, by the first terminal, reception confirmation information of the first message on a first uplink resource, or using the first uplink resource to indicate the reception confirmation information of the first message; wherein the first uplink resource is determined according to a predefined corresponding relationship between the first message and the first uplink resource, or determined according to an uplink resource allocation indication field included in the first message.

In some embodiment of the first aspect, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling; wherein when the message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the message.

In a second aspect, an embodiment of the present disclosure provides a beam indication method, applied to a network side device, and includes: generating a first message, wherein the first message includes beam-related information for indicating N beams, N is an integer greater than or equal to 1; sending the first message to a first terminal.

In some embodiment of the second aspect, the N beams are indicated by one or more of a TCI state, a QCL parameter, SpatialRelationInfo, an index of an uplink reference signal, an index of a downlink reference signal, an index of a synchronization signal, an uplink channel and a downlink channel.

In some embodiment of the second aspect, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

In some embodiment of the second aspect, the N beams are: beams for each of the N channel signal combinations, each channel signal combination includes at least two channels and/or reference signals; or, beams of M terminals, wherein M is an integer greater than or equal to 2 and less than or equal to N.

In some embodiment of the second aspect, the method further includes: transmitting, by the network side device, at least two target channels and/or target reference signals according to the beam-related information.

In some embodiment of the second aspect, N is equal to 1; the transmitting, by the network side device, at least two target channels and/or target reference signals according to the beam-related information includes: determining only one beam indicated by the beam-related information as a first beam; determining the at least two target channels and/or target reference signals according to preconfigured information or according to combination indication information for indicating the channel signal combination; transmitting the at least two target channels and/or target reference signals with the first terminal based on the first beam.

In some embodiment of the second aspect, N is greater than 1; the transmitting, by the network side device, at least two target channels and/or target reference signals according to the beam-related information includes: when the N beams are the beams for each of the N channel signal combinations, determining a first beam of each channel signal combination according to a first corresponding relationship between the N beams and the channel signal combination, transmitting channels and/or signals in a corresponding channel signal combination with the first terminal based on the first beam of each channel signal combination; when the N beams are the beams of M terminals, determining a first beam of each terminal according to a second corresponding relationship between the N beams and the terminal; determining the at least two target channels and/or target reference signals according to the preconfigured information or the combination indication information sent by the network side device and for indicating the channel signal combination; transmitting the at least two target channels and/or target reference signals with each terminal based on the first beam.

In some embodiment of the second aspect, the channel signal combination is predefined, or determined by the network side device and indicated to the terminal, or determined by the terminal and fed back to the network side device.

In some embodiment of the second aspect, the channel signal combination includes at least one of the following combinations: an uplink channel and/or an uplink reference signal; a downlink channel and/or a downlink reference signal; the uplink channel and the downlink channel; the uplink channel and the downlink reference signal; the uplink reference signal and the downlink channel; the uplink reference signal and the downlink reference signal.

In some embodiment of the second aspect, the first message further includes combination indication information for indicating the channel signal combination.

In some embodiment of the second aspect, a valid time of the beam-related information in the first message is determined by at least one of the following: determining the valid time according to valid time indication information included in the first message, wherein the valid time indication information indicates a time range of the valid time, or the valid time indicates whether the beam-related information is valid; determining the valid time according to a predefined time range; determining the valid time according to configuration on the network side device; wherein the step of transmitting at least two target channels and/or target reference signals according to the beam-related information is performed only when the beam-related information is valid or when a current time belongs to the valid time.

In some embodiment of the second aspect, the predefined time range includes at least one of the following methods: the predefined time range is a time for transmitting the at least two target channels and/or target reference signals once, and the beam-related information is only valid within the time for transmitting the at least two target channels and/or target reference signals once; the predefined time range is a duration of the valid time predefined by a system.

In some embodiment of the second aspect, the method further includes: configuring a method of determining the valid time for the first terminal.

In some embodiment of the second aspect, the configuring a method of determining the valid time for the first terminal comprises: indicating the method of determining the valid time through the first message.

In some embodiment of the second aspect, the method further includes at least one of the following: sending a second message to the first terminal, wherein the second message includes combination indication information for indicating the channel signal combination; sending a third message to the first terminal, wherein the third message includes beam valid indication information for indicating whether the channel signal combination uses the beam in the beam-related information, or includes time indication information for indicating a valid time of a beam using the beam in the beam-related information; the valid time of the beam in the beam-related information used by the channel signal combination is predefined or configured by the network side device; wherein the step of transmitting at least two target channels and/or target reference signals according to the beam-related information is performed only when the beam valid indication information is valid or a current time belongs to the valid time.

In some embodiment of the second aspect, the at least two channels and/or reference signals are at least two of physical downlink control channel (PDCCH), physical uplink shared channel (PUSCH), channel state information reference signal (CSI-RS) and sounding reference signal (SRS).

In some embodiment of the second aspect, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling; wherein when the first message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the first message.

In some embodiment of the second aspect, when the first message is indicated by one of UE group common DCI, DCI format 0-1, DCI format 0-2, DCI format 1-0, DCI format 1-1 and dedicated physical layer dynamic signaling, the method further includes: determining whether the first terminal has received the first message according to reception confirmation information of the first message fed back by the first terminal on the first uplink resource, or according to reception confirmation information of the first message indicated by the first terminal using the first uplink resource; wherein, the first uplink resource is determined according to a predefined corresponding relationship between the first message and the first uplink resource, or determined according to an uplink resource allocation indication field included in the first message.

In some embodiment of the second aspect, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling; wherein when the message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the message.

In a third aspect, an embodiment of the present disclosure provides a beam indication device, applied to a first terminal, comprising: a receiving module, configured to receive a first message, wherein the first message includes beam-related information for indicating N beams, N is an integer greater than or equal to 1; a transmission control module, configured to transmit at least two target channels and/or target reference signals according to the beam-related information.

In a fourth aspect, an embodiment of the present disclosure provides a first terminal, comprising: a memory, a processor, a transceiver, and a program stored on the memory and executed by the processor; wherein, the processor executes the program to implement the following steps: receiving a first message, wherein the first message includes beam-related information for indicating N beams, N is an integer greater than or equal to 1; transmitting at least two target channels and/or target reference signals according to the beam-related information.

In a fifth aspect, an embodiment of the present disclosure provides a beam indication device, applied to network side equipment, comprising: a message generation module, configured to generate a first message, wherein the first message includes beam-related information for indicating N beams, N is an integer greater than or equal to 1; a message sending module, configured to send the first message to a first terminal.

In a sixth aspect, an embodiment of the present disclosure provides a network side device, comprising: a memory, a processor, a transceiver, and a program stored in the memory and executed by the processor; wherein, the processor executes the program to implement the following steps: generating a first message, wherein the first message includes beam-related information for indicating N beams, N is an integer greater than or equal to 1; sending the first message to a first terminal.

In a seventh aspect, an embodiment of the present disclosure provides a computer storage medium, comprising instructions, wherein when the instructions are run on a computer, the computer executes the beam indication method.

The embodiment of the present disclosure has the following beneficial effect:

One signaling message is used to indicate beamforming of a plurality of channels/reference signals, so as to reduce the complexity of the beam indication and overhead of the indication signaling, support dynamic beam indication and increase the flexibility of uplink and downlink beam control.

BRIEF DESCRIPTION OF THE DRAWINGS

Various other advantages and benefits will become apparent to those of ordinary skill in the art upon reading the following detailed description of the embodiments. The drawings are only for purposes of illustrating the embodiments and are not to be considered as limitations of the present disclosure. The same reference numerals are used to designate the same parts throughout the drawings.

DETAILED DESCRIPTION

Figure 1:
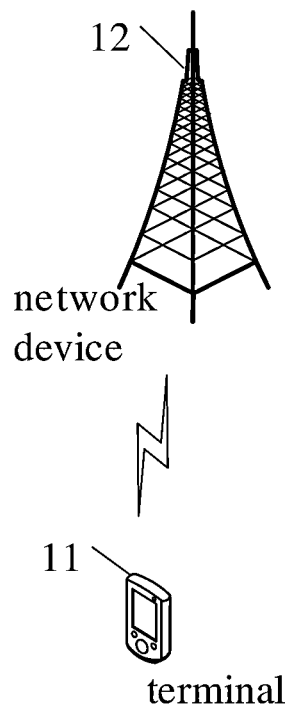
FIG. 1 is a schematic diagram of a wireless communication system according to an embodiment of the present disclosure.

Exemplary embodiments of the present disclosure will be described in more detail below with reference to the accompanying drawings. Although exemplary embodiments of the present disclosure are shown in the drawings, it should be understood that the present disclosure may be embodied in various forms and should not be limited by the embodiments set forth herein. Rather, these embodiments are provided for more thorough understanding of the present disclosure and to fully convey the scope of the present disclosure to those skilled in the art.

The terms "first", "second" and the like in the specification and claims of the present disclosure are used to distinguish similar objects, and are not necessarily used to describe a specific order or sequence. It is to be understood that the data are interchangeable under appropriate circumstances such that the embodiments of the disclosure described herein are, for example, capable of practice in sequences other than those illustrated or described herein. Furthermore, the terms "comprising" and "including", as well as any variations thereof, are intended to cover a non-exclusive inclusion, for example, a process, method, system, product or device comprising a sequence of steps or elements is not necessarily limited to the expressly listed ones, instead may include other steps or elements not explicitly listed or inherent to the process, method, product or device. "And/or" in the specification and claims means at least one of the connected elements.

The techniques described herein are not limited to Long Time Evolution (LTE), LTE-Advanced (LTE-A) systems, and 5G NR systems, and can also be used in other various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and new communication systems that will appear in the future. The terms "system" and "network" are often used interchangeably. A CDMA system may implement radio technologies such as CDMA2000, Universal Terrestrial Radio Access (UTRA), and the like. UTRA includes Wideband Code Division Multiple Access (WCDMA) and other CDMA variants. A TDMA system implements a radio technology such as Global System for Mobile Communication (GSM). The OFDMA system can implement radio technologies such as UltraMobile Broadband (UMB), Evolution-UTRA (E-UTRA), IEEE 802.21 (Wi-Fi), IEEE 802.16 (WiMAX), IEEE 802.20, Flash-OFDM, etc. UTRA and E-UTRA are parts of the Universal Mobile Telecommunications System (UMTS). LTE and LTE-Advanced (like LTE-A) are new UMTS versions that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. However, the following description describes NR systems for example purposes, and NR terminology is used in most of the following description, although the techniques are applicable to applications other than NR system applications.

The following description provides examples and does not limit the scope, applicability or configuration set forth in the claims. Changes may be made in the function and arrangement of elements discussed without departing from the spirit and scope of the disclosure. Various examples may omit, substitute, or add various procedures or components as appropriate. For example, the methods may be performed in an order different from that described, and various steps may be added, omitted, or combined. Additionally, features described with reference to certain examples may be combined in other examples.

FIG. 1 shows a block diagram of a wireless communication system according to an embodiment of the present disclosure. The wireless communication system includes a terminal 11 and a network device 12. Wherein, the terminal 11 may also be called a user terminal or user equipment (UE), and the terminal 11 may be a mobile phone, a Tablet Personal Computer, a Laptop Computer, a personal digital assistant (PDA), a Mobile Internet Device (MID), a wearable device or a vehicle-mounted device and other terminal-side devices. It should be noted that the specific type of terminal 11 is not limited in the embodiments of the present disclosure. The network device 12 can be a base station and/or a core network element, wherein the above-mentioned base station can be a base station of 5G and later versions (for example: gNB, 5G NR NB, etc.), or a base station in other communication systems (for example: eNB, WLAN access point, or other access point, etc.), wherein a base station may be referred to as Node B, evolved Node B, access point, base transceiver station (BTS), radio base station, radio transceiver, basic Basic Service Set (BSS), Extended Service Set (ESS), Node B, Evolved Node B (eNB), Home Node B, Home Evolved Node B, WLAN access point, WiFi node or any other suitable term in the field, as long as the same technical effect is achieved, the base station is not limited to specific technical terms. In the embodiment of the present disclosure, the base station in the NR system is taken as an example, the specific type of the base station is not limited.

The base stations may communicate with terminals 11 under the control of a controller of the base station, which may be part of a core network or certain base stations in various examples. Some base stations can communicate control information or user data with the core network through the backhaul. In some examples, some of these base stations may communicate with each other directly or indirectly via a backhaul link, the backhaul link may be a wired or wireless communication link. A wireless communication system may support operation on multiple carriers (waveform signals of different frequencies). A multi-carrier transmitter is capable of transmitting modulated signals on the multiple carriers simultaneously. For example, each communication link may be a multi-carrier signal modulated according to various radio technologies. Each modulated signal may be sent on a different carrier and may carry control information (e.g., a reference signal, a control channel, etc.), overhead information, data, and so on.

A base station may communicate wirelessly with terminals 11 via one or more access point antennas. Each base station may provide communication coverage for respective coverage areas. The coverage area of an access point may be divided into sectors that constitute only a portion of the coverage area. A wireless communication system may include different types of base stations (e.g., macro base stations, micro base stations, or pico base stations). The base stations may also utilize different radio technologies, such as cellular or WLAN radio access technologies. Base stations may be associated with the same or different access networks or operator deployments. The coverage areas of different base stations (including coverage areas of base stations of the same or different types, coverage areas utilizing the same or different radio technologies, or coverage areas belonging to the same or different access networks) may overlap.

Communication links in a wireless communication system may include uplinks for carrying uplink (UL) transmissions (e.g., from the terminal 11 to the network device 12), or downlinks for carrying downlink (DL) transmissions (e.g., from the network device 12 to the terminal 11). UL transmissions can also be called reverse link transmissions, and DL transmissions can also be called forward link transmissions. Downlink transmissions may be performed using licensed frequency bands, unlicensed frequency bands, or both. Similarly, uplink transmissions may be performed using licensed frequency bands, unlicensed frequency bands, or both.

Figure 2:
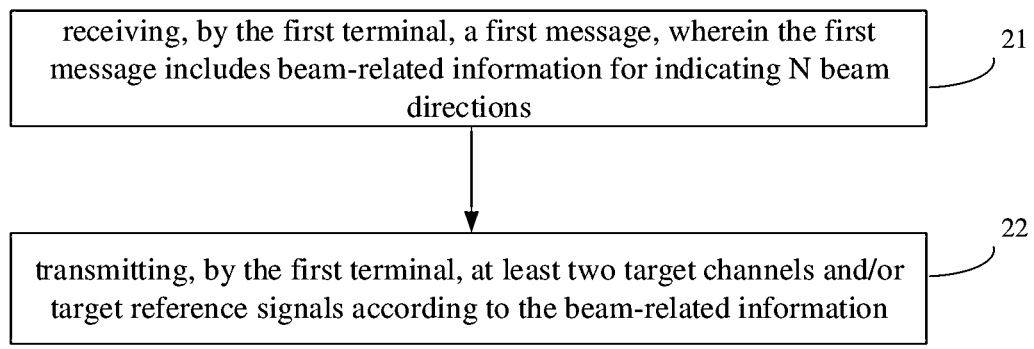
FIG. 2 is a flowchart of a beam indication method according to an embodiment of the present disclosure.

An embodiment of the present disclosure provides a beam indication method. As shown in FIG. 2, when the method is applied to the first terminal side, it includes:

Step 21, receiving, by the first terminal, a first message, wherein the first message includes beam-related information for indicating N beams, N is an integer greater than or equal to 1.

Here, in the embodiment of the present disclosure, the beam-related information is carried in the first message, and the beam-related information is used to indicate N (greater than or equal to 1) beams. Specifically, the beam in the beam-related information may indicate one or more of the TCI status, quasi co-location (QCL) parameters, spatial relationship information (SpatialRelationInfo), index of an uplink reference signal, index of a downlink reference signal, the index of the synchronization signal, the uplink channel and the downlink channel. Wherein, when the index of the uplink reference signal, the index of the downlink reference signal, the index of the synchronization signal, the uplink channel or the downlink channel are used to indicate the beam, the indicated beam is: a beam most currently used by the uplink reference signal, the downlink reference signal, the synchronization signal, the uplink channel or the downlink channel.

Embodiments of the present disclosure may pre-define or pre-configure various channel signal combinations. Specifically, the channel signal combinations may be pre-defined by the network side and the terminal side, or determined and indicated to the terminal by the network side device, or determined by the terminal and fed back to the network side device. Each channel signal combination includes at least two channels and/or reference signals, where the channels may include one or more of PDSCH, PDCCH, PUSCH, and PUCCH, and the reference signals may include one or more of CSI-RS and SRS. Specifically, the channel signal combination may include at least one of the following combinations:

1) Uplink channel and/or uplink reference signal;
2) downlink channel and/or downlink reference signal;
3) Uplink channel and downlink channel;
4) Uplink channel and downlink reference signal;
5) Uplink reference signal and downlink channel;
6) Uplink reference signal and downlink reference signal.

The beam-related information in the first message may be the beam of each of the N channel signal combinations. In this way, the first message may indicate the beams of at least two channels and/or reference signals. Here, the at least two channels and/or reference signals are at least two of PDCCH, PDSCH, PUCCH, PUSCH, CSI-RS and SRS. For example, the at least two channels and/or reference signals may be PDCCH and PDSCH; or, the at least two channels and/or reference signals may be PDCCH, PDSCH and CSI-RS; or, the at least two channels and/or reference signals are PUCCH and PUSCH; or, the at least two channels and/or reference signals are PUCCH, PUSCH and SRS; or, the at least two channels and/or reference signals are PDCCH and PUCCH, etc., which is not illustrated herein.

The beam-related information in the first message may also be beams of M terminals, where M is an integer greater than or equal to 2 and less than or equal to N. Here, there may be at least one beam for each terminal indicated in the beam-related information, and a total of N beams are indicated for M terminals.

In the embodiment of the present disclosure, the first message may indicate through radio resource control (RRC) signaling, media access control layer control element (MAC-CE) signaling, UE group common downlink control information (UE group common DCI), DCI format 0-1, DCI format 0-2, DCI format 1-0, DCI format 1-1. Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Step 22, transmitting, by the first terminal, at least two target channels and/or target reference signals according to the beam-related information.

Here, in the embodiment of the present disclosure, in step 22, the beam indicated by the beam-related information is used to transmit at least two target channels and/or target reference signals. Similarly, the at least two target channels and/or target reference signals are at least two of PDCCH, PDSCH, PUCCH, PUSCH, CSI-RS and SRS.

It should be noted that the transmission described in the embodiments of the present disclosure includes sending and/or receiving. For example, when the beam indicated by the beam-related information is a sending beam, when sending the target channel and/or target reference signal, the sending beam can be used for sending; when receiving the target channel and/or target reference signal, the target channel and/or target reference signal may be received in the direction of the sending beam. Similarly, when the beam indicated by the beam-related information is a receiving beam, when sending the target channel and/or target reference signal, the direction of the receiving beam may be used for sending; when receiving the target channel and/or the target reference signal, the receiving beam may be used for receiving.

Through the above steps, the embodiment of the present disclosure can use the beam indicated by one first message to transmit at least two target channels and/or target reference signals, so as to indicate the beamforming of a plurality of channels/reference signals through one signaling message, thereby reducing the complexity of beam indication and the overhead of indication signaling. In addition, the embodiments of the present disclosure may also send the above-mentioned first message when the beam needs to be changed, so as to realize dynamic beam indication and increase the flexibility of uplink and downlink beam control.

In some embodiments of the present disclosure, when the first message indicates by one of the UE group common DCI, DCI format 0-1, DCI format 0-2, DCI format 1-0, DCI format 1-1 and dedicated physical layer dynamic signaling, the first terminal may also feed back the reception confirmation information of the first message on the first uplink resource, or use the first uplink resource to indicate the reception confirmation information of the first message. Here, the first uplink resource is determined according to a predefined corresponding relationship between the first message and the first uplink resource, or according to an uplink resource allocation indication field included in the first message. The reception confirmation information is used to indicate whether the first terminal has received the first message.

The reception confirmation information of the first message is fed back on the first uplink resource. Specifically, ACK/NACK information may be sent on the first uplink resource, and the ACK/NACK is used to indicate that the first message is received/not received. The first uplink resource being used to indicate reception confirmation information of the first message may specifically indicate that the first terminal has received the first message by sending the first uplink resource.

In some embodiments of the present disclosure, the N is equal to 1. At this time, in step 22, transmitting at least two target channels and/or target reference signals according to the beam-related information may specifically include: determining only one beam indicated by the beam-related information as a first beam; determining the at least two target channels and/or target reference signals according to preconfigured information or according to combination indication information sent by the network side and for indicating channel signal combinations; transmitting the at least two target channels and/or target reference signals based on the first beam. Here, the preconfigured information may be predefined by the network side and the terminal side, or preconfigured to the terminal by the network side. The combination indication information may be sent through the first message, and in this case, the first message further includes combination indication information for indicating the combination of the channel signals. Of course, in this embodiment of the present disclosure, the combination indication information may also be sent through other messages.

In some embodiments of the present disclosure, N is greater than 1. At this time, in step 22, transmitting at least two target channels and/or target reference signals according to the beam-related information may specifically include:

a) When the N beams are beams of each channel signal combination in the N channel signal combinations, determining the first beam of each channel signal combination according to a first corresponding relationship between the N beams and the channel signal combinations, transmitting channels and/or signals in the corresponding channel signal combination with the network side based on the first beam of each channel signal combination. Here, the first corresponding relationship may be predefined between the network side and the terminal side, or preconfigured to the terminal by the network side.

b) When the N beams are beams of M terminals, determining the first beam of the first terminal according to a second corresponding relationship between the N beams and the terminals; determining the at least two target channels and/or target reference signals according to the preconfigured information or the combination indication information sent by the network side and for indicating channel signal combinations; transmitting the at least two target channels and/or target reference signals based on the first beam. Here, the second corresponding relationship may be predefined by the network side and the terminal side, or preconfigured to the terminal by the network side.

In addition, the first beam may be at least one beam. When the first beam is greater than or equal to 2, the beam corresponding to each channel signal combination in the first beam may also be determined according to a third corresponding relationship between the beam and the channel signal combination, so as to transmit related channels and/or signals by using the beam corresponding to each channel signal combination.

In order to increase the flexibility of beam control, in the embodiment of the present disclosure, the first message may also include beam valid indication information for indicating whether the channel signal combination uses the beam in the beam-related information, or include beam valid time indication information for indicating the valid time of the beam using the beam in the beam-related information.

For example, when the first message includes the beam valid indication information, in this embodiment of the present disclosure, only when the beam valid indication information is valid, the channel signal combination uses the beam in the beam-related information, and at this time, the step of transmitting at least two target channels and/or target reference signals according to the beam-related information in the above step 22 is performed; and when the beam valid indication information is invalid, the channel signal combination does not use the beam in the beam-related information, the independent beam indication scheme in the related art may be used at this time, which will not be described in detail herein.

For another example, when the first message includes the beam valid time indication information, in this embodiment of the present disclosure, only when the current time belongs to the valid time, the channel signal combination uses the beam in the beam-related information, at this time, the step of transmitting at least two target channels and/or target reference signals according to the beam-related information in the above step 22 will be performed; and when the current time does not belong to the valid time, the channel signal combination does not use the beam in the beam-related information, and the independent beam indication scheme in the related art may be used at this time, which will not be described in detail herein.

Optionally, the valid time of the beam in the beam-related information used by the channel signal combination in the embodiment of the present disclosure may also be predefined (such as pre-agreed by the terminal and the network side) or configured by the network side device.

As another implementation, in this embodiment of the present disclosure, the combination indication information and/or the beam valid indication information may also be sent through messages other than the first message. For example, the network side device may also send the combined indication information through the second message, and/or send the beam valid indication information through the third message. At this time, the first terminal receives a second message, the second message includes combination indication information for indicating the channel signal combination, so that the combination indication information can be obtained; and/or, receiving a third message, the third message includes beam valid indication information for indicating whether the channel signal combination uses the beam in the beam-related information, so that the beam valid indication information can be obtained. For another example, the network side device may also send the combination indication information and beam valid indication information simultaneously through a fourth message, and so on. At this time, the terminal receives the fourth message, and may obtain combination indication information and beam valid indication information. In addition, as yet another implementation, the third message may include the beam valid indication information or time indication information used to indicate the valid time of the beam using the beam in the beam-related information. Similarly, the terminal performs the step of transmitting at least two target channels and/or target reference signals according to the beam-related information only when the beam valid indication information is valid or the current time belongs to the valid time.

Similarly, the first message, the second message, the third message and the fourth message may indicate through one of RRC signaling, MAC-CE signaling, UE group common DCI, DCI format 0-1, DCI format 0-2, DCI format 1-0 and DCI format 1-1. Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that this DCI format is used to indicate the message.

According to at least one embodiment of the present disclosure, the valid time of the beam-related information in the first message may be determined in at least one of the following ways:

1) Determining the valid time according to the valid time indication information included in the first message, wherein the valid time indication information indicates the time range of the valid time, or the valid time indicates the beam-related information is valid.

2) determining the valid time according to a predefined time range.

Here, the predefined time range may include at least one of the following:

A) The predefined time range is the time for one transmission of the at least two target channels and/or target reference signals, and the beam-related information is only valid within the time period of one transmission of the at least two target channels and/or target reference signals;

B) The predefined time range is the duration of the valid time predefined by the system. For example, the predefined time range may be existed locally in the terminal in advance, for example, written into the memory of the terminal when the terminal is manufactured in the factory.

3) Determining the valid time according to the configuration on the network side.

Wherein, the transmitting at least two target channels and/or target reference signals according to the beam-related information in the above step 22 is performed only when the beam-related information is valid or when the current time belongs to the valid time.

Furthermore, the terminal may also obtain the determination method of the valid time according to the configuration of the network side (such as the base station), for example, one of the above three methods is selected. As an implementation, the method for determining the valid time may be indicated by the first message, that is, the method for determining the valid time is configured in the first message.

Figure 3:
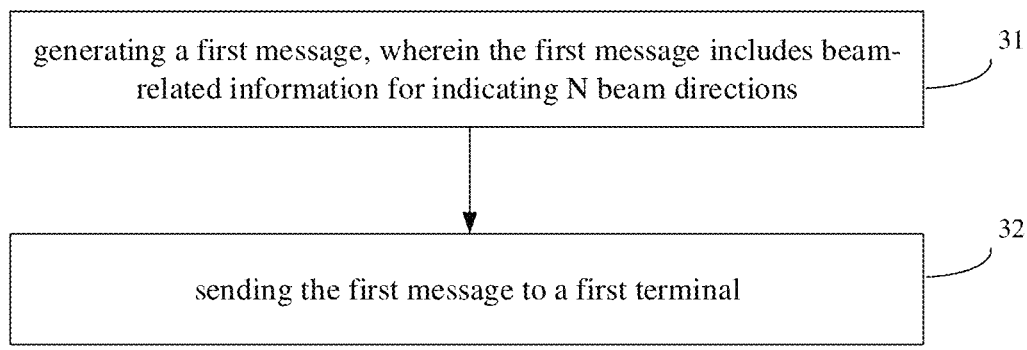
FIG. 3 is another flow chart of a beam indication method according to an embodiment of the present disclosure.

The above describes at least one implementation of the beam indication method of the present disclosure from the terminal side. FIG. 3 shows the beam indication method provided by the embodiment of the present disclosure, when applied to network side device, such as a base station, includes:

Step 31: Generating a first message, wherein the first message includes beam-related information for indicating N beams, N is an integer greater than or equal to 1.

Here, the beam in the beam-related information may indicate one or more of the TCI status, quasi co-location (QCL) parameters, spatial relationship information (SpatialRelationInfo), index of an uplink reference signal, index of a downlink reference signal, the index of the synchronization signal, the uplink channel and the downlink channel. Wherein, when the index of the uplink reference signal, the index of the downlink reference signal, the index of the synchronization signal, the uplink channel or the downlink channel are used to indicate the beam, the indicated beam is: a beam most currently used by the uplink reference signal, the downlink reference signal, the synchronization signal, the uplink channel or the downlink channel.

Embodiments of the present disclosure may pre-define or pre-configure various channel signal combinations. Specifically, the channel signal combinations may be pre-defined by the network side and the terminal side, or determined and indicated to the terminal by the network side device, or determined by the terminal and fed back to the network side device. Each channel signal combination includes at least two channels and/or reference signals, where the channels may include one or more of PDSCH, PDCCH, PUSCH, and PUCCH, and the reference signals may include one or more of CSI-RS and SRS. Specifically, the channel signal combination may include at least one of the following combinations:

1) Uplink channel and/or uplink reference signal;
2) downlink channel and/or downlink reference signal;
3) Uplink channel and downlink channel;
4) Uplink channel and downlink reference signal;
5) Uplink reference signal and downlink channel;
6) Uplink reference signal and downlink reference signal.

The beam-related information in the first message may be the beam of each of the N channel signal combinations. In this way, the first message may indicate the beams of at least two channels and/or reference signals. Here, the at least two channels and/or reference signals are at least two of PDCCH, PDSCH, PUCCH, PUSCH, CSI-RS and SRS. For example, the at least two channels and/or reference signals may be PDCCH and PDSCH; or, the at least two channels and/or reference signals may be PDCCH, PDSCH and CSI-RS; or, the at least two channels and/or reference signals are PUCCH and PUSCH; or, the at least two channels and/or reference signals are PUCCH, PUSCH and SRS; or, the at least two channels and/or reference signals are PDCCH and PUCCH, etc., which is not illustrated herein.

The beam-related information in the first message may also be beams of M terminals, where M is an integer greater than or equal to 2 and less than or equal to N. Here, there may be at least one beam for each terminal indicated in the beam-related information, and a total of N beams are indicated for M terminals.

Step 32, sending the first message to a first terminal.

Here, the first message may indicate through radio resource control (RRC) signaling, media access control layer control element (MAC-CE) signaling, UE group common downlink control information (UE group common DCI), DCI format 0-1, DCI format 0-2, DCI format 1-0, DCI format 1-1. Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Through the above steps, the embodiment of the present disclosure can send the first message from the network side to the terminal, so as to indicate the beamforming of a plurality of channels/reference signals through one signaling message, which can reduce the complexity of beam indication and the overhead of indicating signaling. In addition, the embodiments of the present disclosure may also send the first message when the beam needs to be changed, so as to realize dynamic beam indication and increase the flexibility of uplink and downlink beam control.

After the above step 32, the network side device may also transmit at least two target channels and/or target reference signals according to the beam-related information. Similarly, the at least two target channels and/or target reference signals are at least two of PDCCH, PDSCH, PUCCH, PUSCH, CSI-RS and SRS.

It should be noted that the transmission described in the embodiments of the present disclosure includes sending and/or receiving. For example, when the beam indicated by the beam-related information is a sending beam, when sending the target channel and/or target reference signal, the sending beam can be used for sending; when receiving the target channel and/or target reference signal, the target channel and/or target reference signal may be received in the direction of the sending beam. Similarly, when the beam indicated by the beam-related information is a receiving beam, when sending the target channel and/or target reference signal, the direction of the receiving beam may be used for sending; when receiving the target channel and/or the target reference signal, the receiving beam may be used for receiving.

In some embodiments of the present disclosure, when the first message indicates by one of the UE group common DCI, DCI format 0-1, DCI format 0-2, DCI format 1-0, DCI format 1-1 and dedicated physical layer dynamic signaling, the network side device may determine whether the first terminal has received the first message according to the receipt confirmation information of the first message fed back by the first terminal on the first uplink resource or the reception confirmation information of the first message indicated by the first terminal on the first uplink resource; wherein, the first uplink resource is determined based on the corresponding relationship between the first message and the first uplink resource, or determined according to the uplink resource allocation indication field included in the first message. When the network side device determines that the first terminal has not received the first message, the network side device resends the first message to the first terminal.

In some embodiments of the present disclosure, N is greater than 1. At this time, transmitting, by the network side device, at least two target channels and/or target reference signals according to the beam-related information may specifically include: determining only one beam indicated by the beam-related information as a first beam; determining the at least two target channels and/or target reference signals according to preconfigured information or combination indication information for indicating channel signal combinations; transmitting the at least two target channels and/or target reference signals with the first terminal based on the first beam. Here, the preconfigured information may be predefined by the network side and the terminal side, or preconfigured to the terminal by the network side. The combination indication information may be sent through the first message, and in this case, the first message further includes combination indication information for indicating the combination of the channel signals. Of course, in this embodiment of the present disclosure, the combination indication information may also be sent through other messages.

In some embodiments of the present disclosure, N is greater than 1. At this time, the network side device transmits at least two target channels and/or target reference signals according to the beam-related information, which may specifically include:

a) When the N beams are beams of each channel signal combination in the N channel signal combinations, determining the first beam of each channel signal combination according to a first corresponding relationship between the N beams and the channel signal combinations, transmitting channels and/or signals in the corresponding channel signal combination with the first terminal based on the first beam of each channel signal combination. Here, the first corresponding relationship may be predefined between the network side and the terminal side, or preconfigured to the terminal by the network side.

b) When the N beams are beams of M terminals, determining the first beam of the first terminal according to a second corresponding relationship between the N beams and the terminals; determining the at least two target channels and/or target reference signals according to the preconfigured information or the combination indication information sent by the network side and for indicating channel signal combinations; transmitting the at least two target channels and/or target reference signals with the terminal based on the first beam. Here, the second corresponding relationship may be predefined by the network side and the terminal side, or preconfigured to the terminal by the network side.

In addition, the first beam may be at least one beam. When the first beam is greater than or equal to 2, the beam corresponding to each channel signal combination in the first beam may also be determined according to a third corresponding relationship between the beam and the channel signal combination, so as to transmit related channels and/or signals by using the beam corresponding to each channel signal combination.

In order to increase the flexibility of beam control, in the embodiment of the present disclosure, the first message may also include beam valid indication information for indicating whether the channel signal combination uses the beam in the beam-related information, or include beam valid time indication information for indicating the valid time of the beam using the beam in the beam-related information.

For example, when the beam valid indication information is valid, the channel signal combination uses the beam in the beam-related information, and at this time, the network side device will perform the step of transmitting at least two target channel and/or target reference signals according to the beam-related information; when the beam valid indication information is invalid, the channel signal combination does not use the beam in the beam-related information, and at this time, the independent beam indication scheme in the related art may be used at this time, which will not be described in detail herein.

For another example, when the first message includes the beam valid time indication information, in this embodiment of the present disclosure, only when the current time belongs to the valid time, the channel signal combination uses the beam in the beam-related information, At this time, the network side performs the step of transmitting at least two target channels and/or target reference signals according to the beam-related information; and when the current time does not belong to the valid time, the channel signal combination does not use the beam in the beam-related information, the independent beam indication scheme of the related art may be used at this time, which will not be described in detail herein.

Optionally, the valid time of the beam in the beam-related information used by the channel signal combination in the embodiment of the present disclosure may also be predefined (such as pre-agreed by the terminal and the network side) or configured by the network side device.

As another implementation, in this embodiment of the present disclosure, the combination indication information and/or the beam valid indication information may also be sent through messages other than the first message. For example, the network side device may also send the combination indication information through the second message, and/or send the beam valid indication information through the third message. For another example, the network side device may also send the combination indication information and beam valid indication information simultaneously through the fourth message, and so on.

In addition, as yet another implementation, the third message may include the beam valid indication information or time indication information used to indicate the valid time of the beam using the beam in the beam-related information. Similarly, the terminal performs the step of transmitting at least two target channels and/or target reference signals according to the beam-related information only when the beam valid indication information is valid or the current time belongs to the valid time.

Similarly, the first message, the second message, the third message and the fourth message may indicate through one of RRC signaling, MAC-CE signaling, UE group common DCI, DCI format 0-1, DCI format 0-2, DCI format 1-0 and DCI format 1-1. Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that this DCI format is used to indicate the message.

According to at least one embodiment of the present disclosure, the network side device may determine the valid time of the beam-related information in the first message in at least one of the following:

1) Determining the valid time according to the valid time indication information included in the first message, wherein the valid time indication information indicates the time range of the valid time, or the valid time indicates the beam-related information is valid.

2) determining the valid time according to a predefined time range.

Here, the predefined time range may include at least one of the following:

A) The predefined time range is the time for one transmission of the at least two target channels and/or target reference signals, and the beam-related information is only valid within the time period of one transmission of the at least two target channels and/or target reference signals;

B) The predefined time range is the duration of the valid time predefined by the system. For example, the predefined time range may be existed locally in the terminal in advance, for example, written into the memory of the terminal when the terminal is manufactured in the factory.

3) Determining the valid time according to the configuration on the network side device (base station).

Wherein, the above step of transmitting at least two target channels and/or target reference signals according to the beam-related information is performed only when the beam-related information is valid or when the current time belongs to the valid time.

Furthermore, the network side device may also configure a method of determining the valid time for the first terminal. At this time, the terminal may also obtain the method for determining the valid time according to the configuration of the network side device, for example, one of the above three methods is selected. As an implementation, the method for determining the valid time may be indicated by the first message, that is, the network side device may configure the method of determining the valid time in the first message.

The implementation of the beam indication method in the embodiments of the present disclosure on both the terminal and the network side is described below. Several examples of applying the beam indication method according to the embodiments of the present disclosure are further provided below in conjunction with the accompanying drawings. In the following examples, the beam-related information field is used to carry beam-related information; the beam valid indication information field is used to carry beam valid indication information; the channel signal combination indication field is used to carry combination indication information; the first signaling is the first message described in the embodiment of the present disclosure.

EXAMPLE 1

The base station determines the first signaling, and its format is shown in Table 1 and includes a beam-related information field, which includes N=1 beam information; and also includes a beam valid indication information field of channel combination. The beam may be indicated by the TCI state or may be indicated by the QCL parameter or the SpatialRelationInfo parameter. Hereinafter, they are all referred to as beams for short.

TABLE 1

| Beam-related information field | Beam valid indication information field |
| --- | --- |

The system predefines channels and/or reference signals combination as all uplink and downlink channels, that is, the N=1 beams are used for PDCCH/PDSCH/PUCCH/PUSCH. Assume that the system configures S=128 TCI states for the terminal, denoted as TCI0, TCI1, . . . , TCI127, and each state corresponds to one beam. Through the beam scanning of the base station, TCI6 is determined as the beam of all channels. The first signaling in Table 2 (that is, the first message) is used for indicating the terminal.

TABLE 2

| TCI6 | ON |
| --- | --- |

After receiving the first signaling, the terminal determines that the subsequent PDCCH channel, PDSCH channel, PUCCH channel and PUSCH channel all use the beam indicated by TCI6 for transmission according to the state of the beam valid indication information field being 'ON'.

If the terminal receives the first signaling shown in Table 3 (that is, the first message), the state of the beam valid indication information field being 'OFF' indicates that the beam of the channel combination is invalid. Then the PDCCH channel, PDSCH channel, PUCCH channel and PUSCH channel respectively use the beams indicated by their respective beam indication signaling for transmission. That is, the NR system beam indication method in the related art is adopted. Alternatively, after the OFF state, all channels use their respective default beams for transmission. The four channels no longer use the same beam for transmission.

TABLE 3

| TCI6 | OFF |
| --- | --- |

The first signaling may be transmitted using DCI of the UE group common. One DCI format 2-7 can be added to the current DCI for transmission. It is also possible to use UE-specific DCI for transmission. For example, taking DCI format 1-1 as an example, one possible method is to use the 'Transmission configuration indication' field as the beam-related information field to indicate TCI6. And the 'Time domain resource assignment' field is used as the beam valid indication information field, and the value of all 0 means OFF, and all 1 means ON. And when the system predefines that the remaining information fields of the DCI format 1-1 are all 1s, it means that the DCI is the first signaling, otherwise it is the DCI format 1-1 in the normal mode.

EXAMPLE 2

The base station determines the first signaling, and its format is shown in Table 4 and includes a beam-related information field, which includes N=1 beam information; and also includes a beam valid indication information field of channel combination. Also includes an indication field for channel combination.

TABLE 4

| beam valid indication information field | channel signal combination indication field | beam-related information field |
| --- | --- | --- |

The system predefines that the channel and/or reference signal combinations include the following three combinations:

All uplink and downlink channels, all uplink channels, all downlink channels

The channel combination indication field uses 2 bits to indicate one of the combinations. For example, '00' indicates all uplink and downlink channels; '01' indicates all uplink channels; '10' indicates all downlink channels. Assume that the system configures S=128 TCI states for the terminal, denoted as TCI0, TCI1 . . . TCI127, and each state corresponds to one beam. Through the beam scanning of the base station, TCI6 is determined as the beam of the uplink channel. The signaling in Table 5 is used for indicating to the terminal.

TABLE 5

| ON | 01 | TCI6 |
|---|---|---|

After receiving the first signaling, the terminal determines that both the PUCCH channel and PUSCH channel use the beam indicated by TCI6 for transmission according to the state of the beam valid indication information field being 'ON'.

EXAMPLE 3

The base station determines the first signaling, and its format is shown in Table 6 and includes a beam-related information field, which includes N=2 beam information; and also includes a beam valid indication information field for N=2 channel combinations.

TABLE 6

| beam valid indication information field-0 | beam valid indication information field -1 | beam-related information field-0 | beam-related information field -1 |
|---|---|---|---|

The system predefines that the channel and/or reference signal combinations include two combinations: all uplink channels and all downlink channels. All uplink channels correspond to information field-0, and all downlink channels correspond to information field-1.

Assume that the system configures S=128 TCI states for the terminal, denoted as TCI0, TCI1 . . . TCI127, and each state corresponds to one beam. Through the beam scanning of the base station, TCI6 is determined as the beam of the uplink channel, and TCI18 is determined as the beam of the downlink channel. The signaling in Table 7 is used for indicating to the terminal.

TABLE 7

| ON | ON | TCI6 | TCI18 |
|---|---|---|---|

After receiving the first signaling, the terminal determines that the PUCCH channel and PUSCH channel use the beam indicated by TCI6 for transmission according to the state of the beam valid indication information field as 'ON', and the PDCCH and PDSCH channels use the beam indicated by TCI18 for transmission.

If the above two beam-related information fields are configured with the same TCI, it means that all the uplink and downlink channels use the same beam for transmission.

EXAMPLE 4

The base station determines the first signaling, and its format is shown in Table 8 and includes the beam-related information field, which contains N=3 beam information; also includes the beam valid indication information field of channel combination.

TABLE 8

| beam valid indication information field | beam-related information field -0 | beam-related information field -1 | beam-related information field -2 |
|---|---|---|---|

The above N=3 beam information respectively correspond to three terminals. System predefines that the channels and/or reference signal combination is all uplink and downlink channels.

Assume that the system configures 128, 64, and 128 TCI states for three terminals respectively, and each state corresponds to one beam. Through the beam scanning of the base station, TCI6 in the 128 TCI states is determined as the beam of the channel combination of terminal 0, TCI60 in the 64 TCI states is determined as the beam of the channel combination of terminal 1, and TCI78 in the 128 TCI states is determined as the beam of the channel combination of terminal 2. The signaling in Table 9 is used for indicating to the terminal.

TABLE 9

| ON | TCI6 | TCI60 | TCI78 |
|---|---|---|---|

The first signaling may be transmitted using UE group common DCI. A DCI format 2-7 can be added to the current DCI for transmission. After receiving the first signaling, each terminal determines the corresponding beam-related information field, and then determines the transmission beam of all channels according to the state of the beam valid indication information field being 'ON'. For example, the terminal 2 determines that the subsequent PDCCH/PDSCH and PUCCH/PUSCH channels all use the beam indicated by the TCI78 for transmission.

EXAMPLE 5

The base station determines the first signaling, and its format is shown in Table 10 and includes a beam-related information field, which includes N=1 beam information; and also includes a beam valid indication information field of channel combination.

TABLE 10

| beam-related information field | beam valid indication information field |
|---|---|

The system predefines that the channels and/or reference signal combination is all uplink and downlink channels and uplink and downlink reference signals for CSI acquisition, that is, the N=1 beams are used for PDCCH/PDSCH/PUCCH/PUSCH/CSI-RS for CSI acquisition (Channel state information reference signal for CSI acquisition)/SRS for codebook or noncodebook (SRS based on codebook or non-codebook). The beam information predefined by the system can be configured as an uplink channel or a downlink channel, that is, it can be configured as 'PDCCH', 'PDSCH', 'PUCCH' and 'PUSCH'. It indicates that the beam is the same as the latest beam of the channel indicated in the beam-related information field. The signaling in Table 11 is used for indicating to the terminal.

TABLE 11

| PDCCH | ON |
|---|---|

After receiving the first signaling, the terminal determines the subsequent PDCCH channel, PDSCH channel, PUCCH channel, PUSCH channel, CSI-RS for CSI acquisition, SRS for codebook and SRS for noncodebook all use the beam used by the last PDCCH transmission according to the state of the beam valid indication information field as 'ON'.

EXAMPLE 6

The base station determines the first signaling, and its format is shown in Table 12 and includes a beam-related information field, which contains N=1 beam information; and also includes a channel signal combination indication field. The channel signal combination indication field uses 4 bits, and each bit corresponds to one channel. As shown in Table 12, PDCCH, PDSCH, PUCCH, and PUSCH are the channel corresponding to each bit in the channel signal combination indication field.

TABLE 12

| beam-related information field | PDCCH | PDSCH | PUCCH | PUSCH |
|---|---|---|---|---|

Assuming that the system determines that the combination of channels applying the same beam is PDCCH and PDSCH, the corresponding information fields are set to 1 respectively. Assume that the system configures 128 TCI states for the terminals, and each state corresponds to one beam. Through the beam scanning of the base station, TCI9 among the 128 TCI states is determined as the beam of the channel combination, and then the signaling in Table 13 is used for indicating to the terminal.

TABLE 13

| TCI9 | 1 | 1 | 0 | 0 |
|---|---|---|---|---|

After receiving the first signaling, the terminal determines that subsequent PDCCH channels and PDSCH channels use beams corresponding to TCI9 for transmission.

Further, there is no beam valid indication information field in the first signaling. The signaling can be scrambled by different RNTIs to distinguish whether the beam is valid or the beam is invalid. For example, the first signaling scrambled by RNTI1 indicates that the beam is valid, and the first signaling scrambled by RNTI2 indicates that the beam is invalid. This method can also be applied to other embodiments; or The valid time of the beam predefined by the system is from a time when the first signaling is received to a time when the first signaling is received next time. The beam corresponding to TCI9 is used within this time duration, and after receiving the first signaling next time, the beam is replaced with the beam indicated in the first signaling. This method can also be applied to other embodiments; or, The system predefines that the valid time of the beam is Q=10 time slots after receiving the first signaling. The beam corresponding to TCI9 is used within this time duration. This method can also be applied to other embodiments; or, The valid time of the beam predefined by the system is one channel transmission. For example, TCI9 is only used for subsequent channel transmission of PDSCH and PDCCH. After one channel transmission is completed, TCI9 becomes invalid.

Further, it can be configured by the base station whether the valid time of the beam is Q=10 time slots after receiving the first signaling, or whether the valid time of the beam is one channel transmission. For example, the beam valid time field is also included in the first signaling, which uses 1 bit. When the value is '1', it indicates that the valid time of the beam is Q=10 time slots after receiving the first signaling, and when the value is '0', it indicates that the valid time of the beam is one channel transmission. High-level signaling may also indicate which method is used to determine the valid time of the beam.

The base station indicates the valid time of the beam through physical layer signaling or high layer signaling. For example, the system configures beam valid time as {10, 20, 100, 1000} slots through RRC signaling. The first signaling includes one valid time indication field, as shown in Table 14. The beam valid time indication information field uses 2 bits to respectively indicate the above-mentioned 10, 20, 100 and 1000 slots.

TABLE 14

| beam-related information field | beam valid time indication information field |
|---|---|

If the instructions in Table 15 are used, it means that the valid time is 10 slots starting from this signaling. The beam corresponding to TCI6 is used.

TABLE 15

| TCI6 | 00 |
|---|---|

This method can also be applied to other embodiments.

EXAMPLE 7

The base station determines the first signaling, which at least includes two information fields shown in Table 16. The beam-related information field includes N=1 beam information, which is used to indicate one common beam; the uplink channel resource allocation field indicates uplink PUCCH resource information or uplink PUSCH resource information or PRACH resource information.

TABLE 16

| beam-related information field | uplink channel resource allocation field |
|---|---|

After receiving the first signaling, the terminal feeds back ACK/NACK information on the PUCCH resource or PUSCH resource to indicate whether the beam information is received correctly, and the base station receives the ACK/NACK information reported by the terminal on the PUCCH resource or PUSCH resource. If the ACK information is reported, it means that the terminal has correctly received the first signaling. If the reported information is NACK information or no feedback from the terminal is received on the PUCCH resource or the PUSCH resource, the first signaling is not correctly received by the terminal. The base station will retransmit the first signaling.

or,

After the terminal receives the first signaling, the terminal sends a PRACH resource to inform the base station that the first signaling has been received. The base station receives the PRACH resource. If the PRACH resource is received at a corresponding location, it means that the terminal has correctly received the first signaling; if the PRACH resource is not received, the first signaling has not been correctly received by the terminal. At this time, the base station can retransmit the first signaling.

EXAMPLE 8

The base station determines the first signaling, which at least includes one information field shown in Table 17. The beam-related information filed includes N=1 beam information, which is used to indicate one common beam.

TABLE 17

| beam-related information filed |
|---|

The system predefines the relationship between uplink resources and the first signaling. For example, the system predefines that ACK/NACK information is fed back on a closest uplink resource (such as a PUCCH resource) when the first signaling is sent; or the system predefines that the PRACH is set on a closest random access opportunity (RACH Occasion, RO) when the first signaling is sent. The system may also predefines that the ACK/NACK information is fed back on the closest uplink resource offset by K slots after the first signaling is sent. Or the system predefines that the PRACH is sent on the closest random access opportunity (RACH Occasion, RO) offset by the K slots after the first signaling is sent.

After receiving the first signaling, the terminal feeds back ACK/NACK information on the PUCCH resource to indicate whether the beam information is received correctly. Or, the terminal sends a PRACH resource to inform the base station that the first signaling is received.

The base station receives the ACK/NACK information reported by the terminal on the PUCCH resource according to the predefined relationship. If the ACK information is reported, it means that the terminal has correctly received the first signaling. If the reported information is NACK information or no feedback from the terminal is received on the PUCCH resource, it means that the first signaling is not correctly received by the terminal. The base station will retransmit the first signaling. or, The base station receives the PRACH resource. If the PRACH resource is received at the corresponding location, it means that the terminal has correctly received the first signaling. If the PRACH resource is not received, the first signaling is not correctly received by the terminal. The base station will retransmit the first signaling.

Various methods of the embodiments of the present disclosure have been introduced above. A device for implementing the above method will be further provided below.

Figure 4:
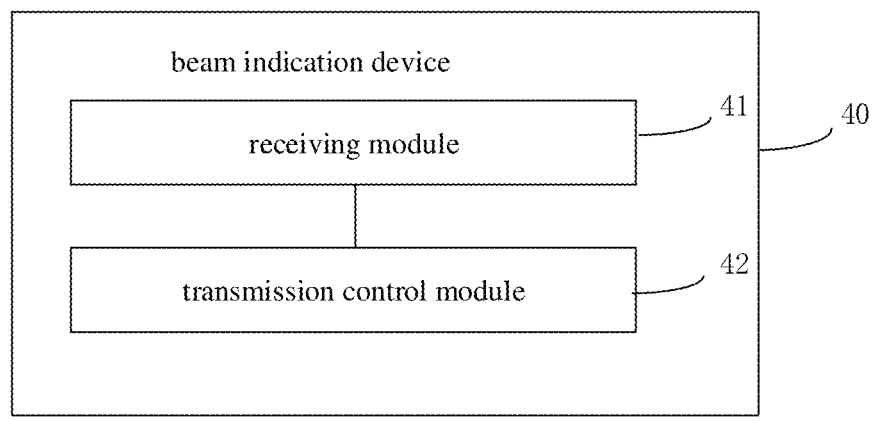
FIG. 4 is a structural diagram of a beam indication device according to an embodiment of the present disclosure.

Referring to FIG. 4, an embodiment of the present disclosure provides a beam indication device 40 that can be applied to a first terminal. As shown in FIG. 4, the beam indication device 40 includes:

a receiving module 41, configured to receive a first message, wherein the first message includes beam-related information for indicating N beams, N is an integer greater than or equal to 1;

a transmission control module 42, configured to transmit at least two target channels and/or target reference signals according to the beam-related information.

Optionally, the N beams are indicated by one or more of a TCI state, a quasi co-location (QCL) parameter, spatial relationship information (SpatialRelationInfo), an index of an uplink reference signal, an index of a downlink reference signal, an index of a synchronization signal, an uplink channel and a downlink channel.

Optionally, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

Optionally, the N beams are:

Beams for each of the N channel signal combinations, each channel signal combination includes at least two channels and/or reference signals; or, Beams of M terminals, wherein M is an integer greater than or equal to 2 and less than or equal to N.

Optionally, the N is equal to 1; the transmission control module 42 is further configured to:

determine only one beam indicated by the beam-related information as a first beam;

determine the at least two target channels and/or target reference signals according to preconfigured information or according to combination indication information sent by the network side and for indicating channel signal combinations;

transmit the at least two target channels and/or target reference signals with the network side based on the first beam.

Optionally, the N is greater than 1; the transmission control module 42 is further configured to:

when the N beams are beams of each channel signal combination in the N channel signal combinations, determine the first beam of each channel signal combination according to a first corresponding relationship between the N beams and the channel signal combinations, transmit channels and/or signals in the corresponding channel signal combination with the network side based on the first beam of each channel signal combination;

when the N beams are beams of M terminals, determine the first beam of the first terminal according to a second corresponding relationship between the N beams and the terminals; determine the at least two target channels and/or target reference signals according to the preconfigured information or the combination indication information sent by the network side and for indicating channel signal combinations; transmit the at least two target channels and/or target reference signals with the network side based on the first beam.

Optionally, the channel signal combination is predefined, or determined by the network side device and indicated to the terminal, or determined by the terminal and fed back to the network side device.

Optionally, the channel signal combination includes at least one of the following combinations:

uplink channel and/or uplink reference signal;
downlink channel and/or downlink reference signal;
uplink channel and downlink channel;
uplink channel and downlink reference signal;

uplink reference signal and downlink channel;
uplink reference signal and downlink reference signal.

Optionally, the first message further includes combination indication information for indicating the channel signal combination.

Optionally, the transmission control module is further configured to determine a valid time of the beam-related information in the first message by at least one of the following methods:
  determining the valid time according to the valid time indication information included in the first message, wherein the valid time indication information indicates the time range of the valid time, or the valid time indicates the beam-related information is valid;
  determining the valid time according to a predefined time range;
  determining the valid time according to the configuration on the network side;
Wherein, the step of transmitting at least two target channels and/or target reference signals according to the beam-related information is performed only when the beam-related information is valid or when a current time belongs to the valid time.

Optionally, the predefined time range includes at least one of the following:
The predefined time range is the time for one transmission of the at least two target channels and/or target reference signals, and the beam-related information is only valid within the time period of one transmission of the at least two target channels and/or target reference signals;
The predefined time range is the duration of the valid time predefined by the system.

Optionally, the transmission control module may also be configured to obtain a method of determining the valid time according to configuration on the network side.

Optionally, the method of determining the valid time may be indicated by the first message.

Optionally, the first message further includes beam valid indication information for indicating whether the channel signal combination uses the beam in the beam-related information;
Wherein, the step of transmitting at least two target channels and/or target reference signals according to the beam-related information is performed only when the beam valid indication information is valid.

Optionally, the receiving module 41 is further configured to:
  receiving a second message, wherein the second message includes combination indication information for indicating the channel signal combination;
  and/or,
  receiving a third message, wherein the third message includes beam valid indication information for indicating whether the channel signal combination uses the beam in the beam-related information, or includes time indication information for indicating a valid time of a beam using the beam in the beam-related information.

Optionally, the valid time for the channel signal combination to use the beam in the beam-related information is predefined or configured by the network side device;
Wherein, the step of transmitting at least two target channels and/or target reference signals according to the beam-related information is performed only when the beam valid indication information is valid or the current time belongs to the valid time.

Optionally, the at least two channels and/or reference signals are at least two of physical downlink control channel (PDCCH), physical downlink shared channel (PDSCH), physical uplink control channel (PUCCH), physical uplink shared channel (PUSCH), channel state information reference signal (CSI-RS) and sounding reference signal (SRS).

Optionally, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling;
Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Optionally, when the message is indicated by one of UE group common DCI, DCI format 0-1, DCI format 0-2, DCI format 1-0, DCI format 1-1 and dedicated physical layer dynamic signaling, the first terminal further includes:
A sending module, configured to feed back reception confirmation information of the first message on a first uplink resource, or use the first uplink resource to indicate the reception confirmation information of the first message;
Wherein, the first uplink resource is determined according to a predefined corresponding relationship between the first message and the first uplink resource, or determined according to an uplink resource allocation indication field included in the first message.

Optionally, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling;
Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

It should be noted that the device in this embodiment is a device corresponding to the method shown in FIG. 2, and the implementation in the above method embodiments are all applicable to this device embodiment, and can also achieve the same technical effect. The above-mentioned device provided by the embodiment of the present disclosure can realize all the method steps realized by the above-mentioned method embodiment, and can achieve the same technical effect, and the parts and beneficial effects in this embodiment which is the same as the method embodiment will not be repeated herein.

Figure 5:
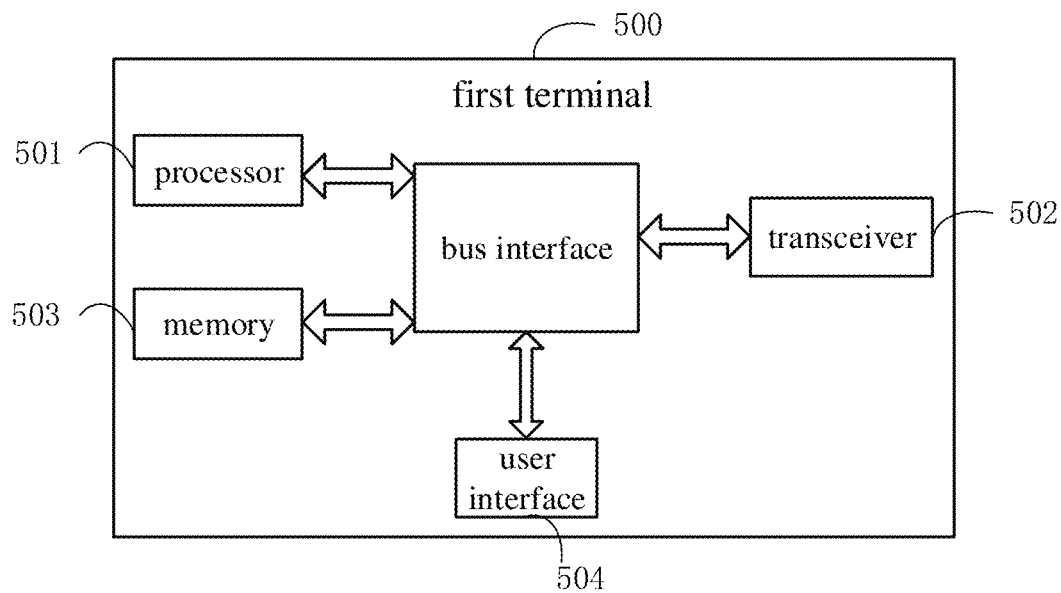
FIG. 5 is a structural diagram of a terminal according to an embodiment of the present disclosure.

Please refer to FIG. 5, which is a schematic structural diagram of a first terminal provided by an embodiment of the present disclosure. The first terminal 500 includes: a processor 501, a transceiver 502, a memory 503, a user interface 504 and a bus interface.

In the embodiment of the present disclosure, the first terminal 500 further includes: a program stored in the memory 503 and executed by the processor 501.

When the processor 501 executes the program to implement the following steps:
  receiving a first message, wherein the first message includes beam-related information for indicating N beams, N is an integer greater than or equal to 1;

transmitting at least two target channels and/or target reference signals according to the beam-related information.

Optionally, the N beams are indicated by one or more of a TCI state, a quasi co-location (QCL) parameter, spatial relationship information (SpatialRelationInfo), an index of an uplink reference signal, an index of a downlink reference signal, an index of a synchronization signal, an uplink channel and a downlink channel.

Optionally, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

Optionally, the N beams are:

Beams for each of the N channel signal combinations, each channel signal combination includes at least two channels and/or reference signals; or, Beams of M terminals, wherein M is an integer greater than or equal to 2 and less than or equal to N.

Optionally, the N is equal to 1; when the processor executes the program to implement the following steps:
determining only one beam indicated by the beam-related information as a first beam;
determining the at least two target channels and/or target reference signals according to preconfigured information or according to combination indication information sent by the network side and for indicating channel signal combinations;
transmitting the at least two target channels and/or target reference signals based on the first beam.

Optionally, the N is greater than 1; when the processor executes the program to implement the following steps:
when the N beams are beams of each channel signal combination in the N channel signal combinations, determining the first beam of each channel signal combination according to a first corresponding relationship between the N beams and the channel signal combinations, transmitting channels and/or signals in the corresponding channel signal combination with the network side based on the first beam of each channel signal combination;
when the N beams are beams of M terminals, determine the first beam of the first terminal according to a second corresponding relationship between the N beams and the terminals; determining the at least two target channels and/or target reference signals according to the preconfigured information or the combination indication information sent by the network side and for indicating channel signal combinations; transmitting the at least two target channels and/or target reference signals with the network side based on the first beam.

Optionally, the channel signal combination is predefined, or determined by the network side device and indicated to the terminal, or determined by the terminal and fed back to the network side device.

Optionally, the channel signal combination includes at least one of the following combinations:
uplink channel and/or uplink reference signal;
downlink channel and/or downlink reference signal;
uplink channel and downlink channel;
uplink channel and downlink reference signal;
uplink reference signal and downlink channel;
uplink reference signal and downlink reference signal.

Optionally, the first message further includes combination indication information for indicating the channel signal combination.

Optionally, the processor also executes the program to implement the following steps:
determining the valid time according to the valid time indication information included in the first message, wherein the valid time indication information indicates the time range of the valid time, or the valid time indicates the beam-related information is valid;
determining the valid time according to a predefined time range;
determining the valid time according to the configuration on the network side;
Wherein, the step of transmitting at least two target channels and/or target reference signals according to the beam-related information is performed only when the beam-related information is valid or when a current time belongs to the valid time.

Optionally, the predefined time range includes at least one of the following:
The predefined time range is the time for one transmission of the at least two target channels and/or target reference signals, and the beam-related information is only valid within the time period of one transmission of the at least two target channels and/or target reference signals;
The predefined time range is the duration of the valid time predefined by the system.

Optionally, the processor also executes the program to implement the following steps:
obtaining a method of determining the valid time according to configuration on the network side.

Optionally, the method of determining the valid time may be indicated by the first message.

Optionally, the first message further includes beam valid indication information for indicating whether the channel signal combination uses the beam in the beam-related information;
Wherein, the step of transmitting at least two target channels and/or target reference signals according to the beam-related information is performed only when the beam valid indication information is valid.

Optionally, the processor also executes the program to implement the following steps:
receiving a second message, wherein the second message includes combination indication information for indicating the channel signal combination;
and/or,
receiving a third message, wherein the third message includes beam valid indication information for indicating whether the channel signal combination uses the beam in the beam-related information, or includes time indication information for indicating a valid time of a beam using the beam in the beam-related information.

Optionally, the valid time for the channel signal combination to use the beam in the beam-related information is predefined or configured by the network side device;
Wherein, the step of transmitting at least two target channels and/or target reference signals according to the beam-related information is performed only when the beam valid indication information is valid or the current time belongs to the valid time.

Optionally, the at least two channels and/or reference signals are at least two of physical downlink control channel (PDCCH), physical downlink shared channel (PDSCH), physical uplink control channel (PUCCH), physical uplink shared channel (PUSCH), channel state information reference signal (CSI-RS) and sounding reference signal (SRS).

Optionally, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Optionally, when the message is indicated by one of UE group common DCI, DCI format 0-1, DCI format 0-2, DCI format 1-0, DCI format 1-1 and dedicated physical layer dynamic signaling, the processor also executes the program to implement the following steps:

feeding back reception confirmation information of the first message on a first uplink resource, or use the first uplink resource to indicate the reception confirmation information of the first message;

Wherein, the first uplink resource is determined according to a predefined corresponding relationship between the first message and the first uplink resource, or determined according to an uplink resource allocation indication field included in the first message.

Optionally, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

In FIG. 5, the bus architecture may include any number of interconnected buses and bridges, specifically various circuits of one or more processors represented by processor 501 and memory represented by memory 503 are linked together. The bus architecture can also link together various other circuits such as peripherals, voltage regulators, and power management circuits, etc., which are well known in the art and therefore will not be further described herein. The bus interface provides the interface. Transceiver 502 may be a plurality of elements, including a transmitter and a receiver, providing a means for communicating with various other devices over transmission media. For different user devices, the user interface 504 may also be an interface capable of connecting externally and internally to required devices, and the connected devices include but are not limited to keypads, displays, speakers, microphones, and joysticks.

The processor 501 is responsible for managing the bus architecture and general processing, and the memory 503 can store data used by the processor 501 when performing operations.

It should be noted that the terminal in this embodiment is a terminal corresponding to the method shown in FIG. 2, and the implementation methods in each of the above embodiments are applicable to this embodiment of the terminal, and can also achieve the same technical effect. In the terminal, the transceiver 502 and the memory 503, as well as the transceiver 502 and the processor 501 can be communicated and connected through the bus interface, the function of the processor 501 can also be realized by the transceiver 502, and the function of the transceiver 502 can also be implemented by the processor 501. The above-mentioned terminal provided by the embodiment of the present disclosure can implement all the method steps implemented by the above-mentioned method embodiment, and can achieve the same technical effect.

In some embodiments of the present disclosure, there is also provided a computer-readable storage medium, on which a program is stored, and when the program is executed by a processor, the following steps are implemented:

receiving a first message, wherein the first message includes beam-related information for indicating N beams, N is an integer greater than or equal to 1;

transmitting at least two target channels and/or target reference signals according to the beam-related information.

When the program is executed by the processor, it can realize all the implementation methods in the above-mentioned beam indication method applied to the terminal side, and can achieve the same technical effect. To avoid repetition, details are not repeated here.

Figure 6:
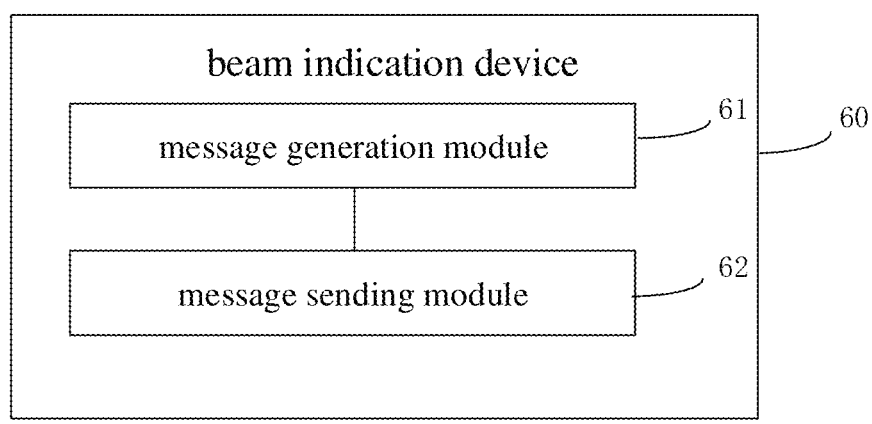
FIG. 6 is another structural diagram of a beam indication device according to an embodiment of the present disclosure.

An embodiment of the present disclosure provides a beam indication device shown in FIG. 6, which can be applied to a network side device. The beam indication device 60 provided by the embodiment of the present disclosure includes:

A message generation module 61, configured to generate a first message, wherein the first message includes beam-related information for indicating N beams, N is an integer greater than or equal to 1;

A message sending module 62, configured to send the first message to a first terminal.

Optionally, the N beams are indicated by one or more of a TCI state, a quasi co-location (QCL) parameter, spatial relationship information (SpatialRelationInfo), an index of an uplink reference signal, an index of a downlink reference signal, an index of a synchronization signal, an uplink channel and a downlink channel.

Optionally, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

Optionally, the N beams are:

Beams for each of the N channel signal combinations, each channel signal combination includes at least two channels and/or reference signals; or, Beams of M terminals, wherein M is an integer greater than or equal to 2 and less than or equal to N.

Optionally, the beam indication device further includes:

a transmission module, configured to transmit at least two target channels and/or target reference signals according to the beam-related information.

Optionally, the N is equal to 1; the transmission module is also configured to:

determine only one beam indicated by the beam-related information as a first beam;

determine the at least two target channels and/or target reference signals according to preconfigured information or according to combination indication information for indicating channel signal combinations;

transmit the at least two target channels and/or target reference signals with the first terminal based on the first beam.

Optionally, the N is greater than 1; the transmission module is further configured to:

when the N beams are beams of each channel signal combination in the N channel signal combinations, determine the first beam of each channel signal combination according to a first corresponding relationship between the N beams and the channel signal combinations, transmit channels and/or signals in the corresponding channel signal combination with the first terminal based on the first beam of each channel signal combination;

when the N beams are beams of M terminals, determine the first beam of each terminal according to a second corresponding relationship between the N beams and the terminals; determine the at least two target channels and/or target reference signals according to the preconfigured information or the combination indication information sent by the network side and for indicating channel signal combinations; transmit the at least two target channels and/or target reference signals with each terminal based on the first beam.

Optionally, the channel signal combination is predefined, or determined by the network side device and indicated to the terminal, or determined by the terminal and fed back to the network side device.

Optionally, the channel signal combination includes at least one of the following combinations:

Uplink channel and/or uplink reference signal;
downlink channel and/or downlink reference signal;
uplink and downlink channels;
Uplink channel and downlink reference signal;
Uplink reference signal and downlink channel;
Uplink reference signal and downlink reference signal.

Optionally, the first message further includes combination indication information for indicating the channel signal combination.

Optionally, the valid time of the beam-related information in the first message is determined by at least one of the following:

Determining the valid time according to the valid time indication information included in the first message, where the valid time indication information indicates the time range of the valid time, or the valid time indicates whether the beam-related information is valid;

Determining the valid time according to a predefined time range;

Determining the valid time according to configuration on the network side;

Wherein, the step of transmitting at least two target channels and/or target reference signals according to the beam-related information is performed only when the beam-related information is valid or when the current time belongs to the valid time.

Optionally, the predefined time range includes at least one of the following methods:

the predefined time range is a time for transmitting the at least two target channels and/or target reference signals once, and the beam-related information is only valid within the time for transmitting the at least two target channels and/or target reference signals once;

the predefined time range is a duration of the valid time predefined by a system.

Optionally, the device further includes: a configuration module, configured to configure a method for determining the valid time for the first terminal.

Optionally, the configuration module is further configured to indicate a method for determining the valid time through the first message.

Optionally, the first message further includes beam valid indication information for indicating whether the channel signal combination uses the beam in the beam-related information, or further includes beam valid time indication information used to indicate the valid time of the beam using the beam in the beam-related information;

and/or, the valid time of the beam in the beam-related information used by the channel signal combination is predefined or configured by the network side device;

Wherein, the step of transmitting at least two target channels and/or target reference signals according to the beam-related information is performed only when the beam valid indication information is valid.

Optionally, the message sending module 62 is further configured to:

send a second message to the first terminal, wherein the second message includes combination indication information for indicating the channel signal combination;

and/or, send a third message to the first terminal, wherein the third message includes beam valid indication information for indicating whether the channel signal combination uses the beam in the beam-related information, or includes time indication information for indicating a valid time of a beam using the beam in the beam-related information.

Optionally, the valid time of the beam in the beam-related information used by the channel signal combination is predefined or configured by the network side device;

Wherein, the step of transmitting at least two target channels and/or target reference signals according to the beam-related information is performed only when the beam valid indication information is valid or the current time belongs to the valid time.

Optionally, the at least two channels and/or reference signals are at least two of physical downlink control channel (PDCCH), physical downlink shared channel (PDSCH), physical uplink control channel (PUCCH), physical uplink shared channel (PUSCH), channel state information reference signal (CSI-RS) and sounding reference signal (SRS).

Optionally, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Optionally, when the message is indicated by one of UE group common DCI, DCI format 0-1, DCI format 0-2, DCI format 1-0, DCI format 1-1 and dedicated physical layer dynamic signaling, the beam indication device further includes:

A reception confirmation module, configured to determine whether the first terminal has received the first message according to reception confirmation information of the first message fed back by the first terminal on the first uplink resource, or according to reception confirmation information of the first message indicated by the first terminal using the first uplink resource;

Wherein, the first uplink resource is determined according to a predefined corresponding relationship between the first message and the first uplink resource, or determined according to an uplink resource allocation indication field included in the first message.

Optionally, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

It should be noted that the device in this embodiment is a device corresponding to the method shown in FIG. 3, and the implementations in the above embodiments are all applicable to this embodiment of the device, and can also achieve the same technical effect. The above-mentioned device provided by the embodiment of the present disclosure can realize all the method steps realized by the above-mentioned method embodiment, and can achieve the same technical effect.

Figure 7:
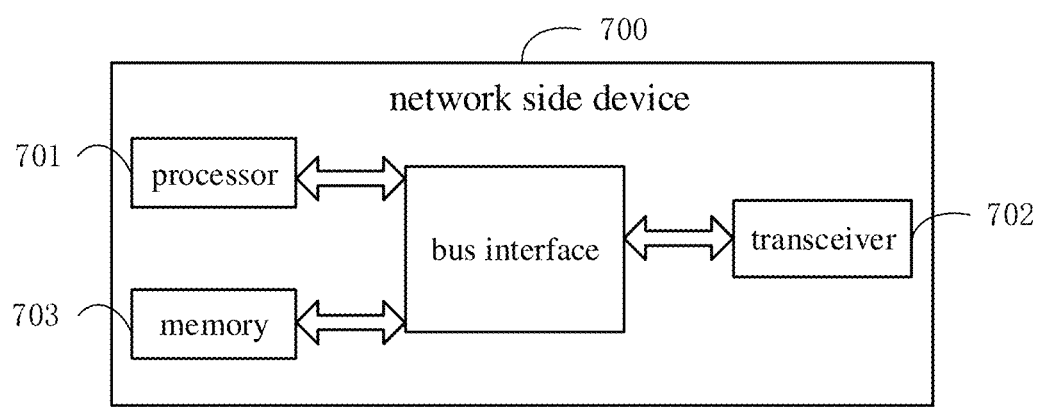
FIG. 7 is a structural diagram of a network side device according to an embodiment of the present disclosure.

Please refer to FIG. 7, an embodiment of the present disclosure provides a schematic structural diagram of a network side device 700, including: a processor 701, a transceiver 702, a memory 703, and a bus interface, wherein:

In the embodiment of the present disclosure, the network side device 700 further includes: a program stored in the memory 703 and executed by the processor 701, when the program is executed by the processor 701 to implement the following steps:

generating a first message, where the first message includes beam-related information for indicating N beams, where N is an integer greater than or equal to 1;
sending the first message to the first terminal.

Optionally, the N beams are indicated by one or more of a TCI state, a quasi co-location (QCL) parameter, spatial relationship information (SpatialRelationInfo), an index of an uplink reference signal, an index of a downlink reference signal, an index of a synchronization signal, an uplink channel and a downlink channel.

Optionally, the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

Optionally, the N beams are:
Beams for each of the N channel signal combinations, each channel signal combination includes at least two channels and/or reference signals; or,
Beams of M terminals, wherein M is an integer greater than or equal to 2 and less than or equal to N.

Optionally, the processor executes the program to implement the following steps:
transmitting at least two target channels and/or target reference signals according to the beam-related information.

Optionally, the N is equal to 1; when the processor executes the program to implement the following steps:
determining only one beam indicated by the beam-related information as a first beam;
determining the at least two target channels and/or target reference signals according to preconfigured information or according to combination indication information for indicating channel signal combinations;
transmitting the at least two target channels and/or target reference signals with the first terminal based on the first beam.

Optionally, the N is greater than 1; when the processor executes the program to implement the following steps:
when the N beams are beams of each channel signal combination in the N channel signal combinations, determining the first beam of each channel signal combination according to a first corresponding relationship between the N beams and the channel signal combinations, transmitting channels and/or signals in the corresponding channel signal combination with the first terminal based on the first beam of each channel signal combination;
when the N beams are beams of M terminals, determine the first beam of each terminal according to a second corresponding relationship between the N beams and the terminals; determining the at least two target channels and/or target reference signals according to the preconfigured information or the combination indication information sent by the network side and for indicating channel signal combinations; transmitting the at least two target channels and/or target reference signals with each terminal based on the first beam.

Optionally, the channel signal combination is predefined, or determined by the network side device and indicated to the terminal, or determined by the terminal and fed back to the network side device.

Optionally, the channel signal combination includes at least one of the following combinations:
Uplink channel and/or uplink reference signal;
downlink channel and/or downlink reference signal;
uplink and downlink channels;
Uplink channel and downlink reference signal;
Uplink reference signal and downlink channel;
Uplink reference signal and downlink reference signal.

Optionally, the first message further includes combination indication information for indicating the channel signal combination.

Optionally, the processor also implements the following steps when executing the program:
Determining the valid time according to the valid time indication information included in the first message, where the valid time indication information indicates the time range of the valid time, or the valid time indicates whether the beam-related information is valid;
Determining the valid time according to a predefined time range;
Determining the valid time according to configuration on the network side;
Wherein, the step of transmitting at least two target channels and/or target reference signals according to the beam-related information is performed only when the beam-related information is valid or when the current time belongs to the valid time.

Optionally, the predefined time range includes at least one of the following methods:
the predefined time range is a time for transmitting the at least two target channels and/or target reference signals once, and the beam-related information is only valid within the time for transmitting the at least two target channels and/or target reference signals once;

the predefined time range is a duration of the valid time predefined by a system.

Optionally, when the processor executes the program to implement the following step: configuring a method for determining the valid time for the first terminal.

Optionally, when the processor executes the program to implement the following step: indicating a method for determining the valid time through the first message.

Optionally, the first message further includes beam valid indication information for indicating whether the channel signal combination uses the beam in the beam-related information, or further includes beam valid time indication information used to indicate the valid time of the beam using the beam in the beam-related information;

and/or, the valid time of the beam in the beam-related information used by the channel signal combination is predefined or configured by the network side device;

Wherein, the step of transmitting at least two target channels and/or target reference signals according to the beam-related information is performed only when the beam valid indication information is valid.

Optionally, when the processor executes the program to implement at least one of the following steps:

sending a second message to the first terminal, wherein the second message includes combination indication information for indicating the channel signal combination;

and/or, sending a third message to the first terminal, wherein the third message includes beam valid indication information for indicating whether the channel signal combination uses the beam in the beam-related information, or includes time indication information for indicating a valid time of a beam using the beam in the beam-related information.

Optionally, the valid time of the beam in the beam-related information used by the channel signal combination is predefined or configured by the network side device;

Wherein, the step of transmitting at least two target channels and/or target reference signals according to the beam-related information is performed only when the beam valid indication information is valid or the current time belongs to the valid time.

Optionally, the at least two channels and/or reference signals are at least two of physical downlink control channel (PDCCH), physical downlink shared channel (PDSCH), physical uplink control channel (PUCCH), physical uplink shared channel (PUSCH), channel state information reference signal (CSI-RS) and sounding reference signal (SRS).

Optionally, the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

Optionally, when the message is indicated by one of UE group common DCI, DCI format 0-1, DCI format 0-2, DCI format 1-0, DCI format 1-1 and dedicated physical layer dynamic signaling, the processor also executes the program to implement the following steps:

determining whether the first terminal has received the first message according to reception confirmation information of the first message fed back by the first terminal on the first uplink resource, or according to reception confirmation information of the first message indicated by the first terminal using the first uplink resource;

Wherein, the first uplink resource is determined according to a predefined corresponding relationship between the first message and the first uplink resource, or determined according to an uplink resource allocation indication field included in the first message.

Optionally, the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling;

Wherein, when the message is indicated by DCI format 0-1, DCI format 0-2, DCI format 1-0 or DCI format 1-1, the value of the preset field in the DCI format 0-1, DCI format 0-2, DCI format 1-0 or DCI format 1-1 is a preset value, and the preset value indicates that the DCI format is used to indicate the message.

In FIG. 7, the bus architecture may include any number of interconnected buses and bridges, specifically various circuits of one or more processors represented by processor 701 and memory represented by memory 703 are linked together. The bus architecture can also link together various other circuits such as peripherals, voltage regulators, and power management circuits, etc., which are well known in the art and therefore will not be further described herein. The bus interface provides the interface. Transceiver 702 may be a plurality of elements, including a transmitter and a receiver, providing a means for communicating with various other devices over transmission media.

The processor 701 is responsible for managing the bus architecture and general processing, and the memory 703 can store data used by the processor 701 when performing operations.

It should be noted that the terminal in this embodiment is a terminal corresponding to the method shown in FIG. 3, and the implementation methods in the above embodiments are all applicable to this embodiment of the terminal, and can also achieve the same technical effect. In the terminal, the transceiver 702 and the memory 703, as well as the transceiver 702 and the processor 701 can be connected through a bus interface, the function of the processor 701 can also be realized by the transceiver 702, and the function of the transceiver 702 can also be implemented by the processor 701. The above-mentioned terminal provided by the embodiment of the present disclosure can implement all the method steps implemented by the above-mentioned method embodiment, and can achieve the same technical effect.

In some embodiments of the present disclosure, there is also provided a computer-readable storage medium, on which a program is stored, and when the program is executed by a processor to implement the following steps:

generating a first message, wherein the first message includes beam-related information for indicating N beams, N is an integer greater than or equal to 1;

sending the first message to a first terminal.

When the program is executed by the processor, it can realize all the implementation methods in the above-mentioned beam indication method applied to the network side device, and can achieve the same technical effect. To avoid repetition, details are not repeated here.

Those skilled in the art can appreciate that the units and algorithm steps of the examples described in conjunction with the embodiments can be implemented by electronic hardware, or a combination of computer software and electronic hardware. Whether these functions are executed by hardware or software depends on the specific application and design constraints of the technical solution. Those skilled in the art may implement the described functionality using different methods for each particular application, but such implementation should not be considered beyond the scope of the present disclosure.

Those skilled in the art can clearly understand that for the convenience and brevity of the description, the specific working process of the above-described system, device and unit can refer to the corresponding process in the foregoing method embodiment, which will not be repeated here.

In the embodiments provided in the present disclosure, it should be understood that the disclosed devices and methods may be implemented in other ways. For example, the device embodiments described above are only illustrative. For example, the division of the units is only a logical function division. In actual implementation, there may be other division methods. For example, multiple units or components can be combined or be integrated into another system, or some features may be ignored, or not implemented. In another point, the mutual coupling or direct coupling or communication connection may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solutions of the embodiments of the present disclosure.

In addition, each functional unit in each embodiment of the present disclosure may be integrated into one processing unit, each unit may exist separately physically, or two or more units may be integrated into one unit.

If the functions described above are realized in the form of software function units and sold or used as independent products, they can be stored in a computer-readable storage medium. Based on this understanding, the essence of the technical solution of the present disclosure or the part that contributes to the related art or the part of the technical solution can be embodied in the form of a software product. The computer software product is stored in a storage medium, including several instructions used to make a computer device (which may be a personal computer, a server, or a network device, etc.) execute all or part of the steps of the methods described in various embodiments of the present disclosure. The aforementioned storage medium includes: various media capable of storing program codes such as U disk, mobile hard disk, ROM, RAM, magnetic disk or optical disk.

The above are optional embodiments of the present disclosure. It should be pointed out that for those skilled in the art, several improvements and modifications can be made without departing from the principles of the present disclosure, and these improvements and modifications should also be regarded as the protection scope of the present disclosure.

What is claimed is:

1. A beam indication method, applied to a first terminal, comprising:
   receiving, by the first terminal, a first message, wherein the first message includes beam-related information for indicating N beams, N is an integer greater than or equal to 1;
   transmitting, by the first terminal, at least two target channels and/or target reference signals according to the beam-related information;
   wherein the N beams comprise:
      beams for each of N channel signal combinations, each channel signal combination includes at least two channels and/or reference signals; or,
      beams of M terminals, wherein M is an integer greater than or equal to 2 and less than or equal to N;
   wherein the channel signal combination is predefined, or determined by the network side device and indicated to the terminal, or determined by the terminal and fed back to the network side device.

2. The method according to claim 1, wherein the N beams are indicated by one or more of a Transmission Configuration Indicator (TCI) state, a quasi co-location (QCL) parameter, spatial relationship information (SpatialRelationInfo), an index of an uplink reference signal, an index of a downlink reference signal, an index of a synchronization signal, an uplink channel and a downlink channel.

3. The method according to claim 2, wherein,
   the beam indicated by the index of the uplink reference signal, the index of the downlink reference signal, the index of the synchronization signal, the uplink channel or the downlink channel is: a beam most currently used by the uplink reference signal, the downlink reference signal, the synchronization signal, the uplink channel or the downlink channel.

4. The method according to claim 1, wherein N is equal to 1;
   the transmitting, by the first terminal, at least two target channels and/or target reference signals according to the beam-related information, includes:
   determining only one beam indicated by the beam-related information as a first beam;
   determining the at least two target channels and/or target reference signals according to preconfigured information or according to combination indication information sent by a network side device and for indicating the channel signal combination;
   transmitting the at least two target channels and/or target reference signals based on the first beam.

5. The method according to claim 1, wherein N is greater than 1;
   the transmitting, by the first terminal, at least two target channels and/or target reference signals according to the beam-related information, includes:
   when the N beams are the beams for each of the N channel signal combinations, determining a first beam of each channel signal combination according to a first corresponding relationship between the N beams and the channel signal combination, transmitting channels and/or signals in a corresponding channel signal combination based on the first beam of each channel signal combination;
   when the N beams are the beams of M terminals, determining a first beam of the first terminal according to a second corresponding relationship between the N beams and the terminal; determining the at least two target channels and/or target reference signals according to the preconfigured information or the combination indication information sent by the network side device and for indicating the channel signal combination; transmitting the at least two target channels and/or target reference signals based on the first beam.

6. The method according to claim 1, wherein the channel signal combination includes at least one of the following combinations:
an uplink channel and/or an uplink reference signal;
a downlink channel and/or a downlink reference signal;
the uplink channel and the downlink channel;
the uplink channel and the downlink reference signal;
the uplink reference signal and the downlink channel;
the uplink reference signal and the downlink reference signal.

7. The method according to claim 1, wherein the first message further includes combination indication information for indicating the channel signal combination.

8. The method according to claim 1, wherein,
a valid time of the beam-related information in the first message is determined by at least one of the following:
determining the valid time according to valid time indication information included in the first message, wherein the valid time indication information indicates a time range of the valid time, or the valid time indicates whether the beam-related information is valid;
determining the valid time according to a predefined time range;
determining the valid time according to configuration on the network side device;
wherein the step of transmitting at least two target channels and/or target reference signals according to the beam-related information is performed only when the beam-related information is valid or when a current time belongs to the valid time.

9. The method according to claim 8, wherein,
the predefined time range includes at least one of the following:
the predefined time range is a time for transmitting the at least two target channels and/or target reference signals once, and the beam-related information is only valid within the time for transmitting the at least two target channels and/or target reference signals once;
the predefined time range is a duration of the valid time predefined by a system.

10. The method according to claim 8, further comprising:
obtaining a method of determining the valid time according to the configuration on the network side,
wherein, the method of determining the valid time is indicated by the first message.

11. The method according to claim 1, further comprising at least one of the following:
receiving, by the first terminal, a second message, wherein the second message includes combination indication information for indicating the channel signal combination;
receiving, by the first terminal, a third message, wherein the third message includes beam valid indication information for indicating whether the channel signal combination uses the beam in the beam-related information, or includes time indication information for indicating a valid time of a beam using the beam in the beam-related information;
the valid time of the beam in the beam-related information used by the channel signal combination is predefined or configured by the network side device;
wherein the step of transmitting at least two target channels and/or target reference signals according to the beam-related information is performed only when the beam valid indication information is valid or a current time belongs to the valid time.

12. The method according to claim 11, wherein,
the first message, the second message and the third message are indicated by one of RRC signaling, MAC-CE signaling, UE group common DCI, DCI format 0-1, DCI format 0-2, DCI format 1-0, DCI format 1-1 and dedicated physical layer dynamic signaling;
wherein when the message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the message.

13. The method according to claim 1, wherein the at least two channels and/or reference signals are at least two of physical downlink control channel (PDCCH), physical downlink shared channel (PDSCH), physical uplink control channel (PUCCH), physical uplink shared channel (PUSCH), channel state information reference signal (CSI-RS) and sounding reference signal (SRS).

14. The method according to claim 1, wherein,
the first message is indicated by one of radio resource control (RRC) signaling, medium access control layer control element (MAC-CE) signaling, user equipment group common downlink control information (UE group common DCI), DCI format 0-1, DCI format 0-2, DCI format 1-0, DCI format 1-1 and dedicated physical layer dynamic signaling;
wherein when the first message is indicated by DCI format 0-1, DCI format 0-2, DCI format 1-0 or DCI format 1-1, a value of a preset field in the DCI format 0-1, DCI format 0-2, DCI format 1-0 or DCI format 1-1 is a preset value, and the preset value indicates that the DCI format is used to indicate the first message.

15. The method according to claim 14, wherein when the first message is indicated by one of UE group common DCI, DCI format 0-1, DCI format 0-2, DCI format 1-0, DCI format 1-1 and dedicated physical layer dynamic signaling, the method further includes:
feeding back, by the first terminal, reception confirmation information of the first message on a first uplink resource, or using the first uplink resource to indicate the reception confirmation information of the first message;
wherein the first uplink resource is determined according to a predefined corresponding relationship between the first message and the first uplink resource, or determined according to an uplink resource allocation indication field included in the first message.

16. A beam indication method, applied to a network side device, comprising:
generating a first message, wherein the first message includes beam-related information for indicating N beams, N is an integer greater than or equal to 1;
sending the first message to a first terminal;
wherein the N beams are:
beams for each of N channel signal combinations, each channel signal combination includes at least two channels and/or reference signals; or,
beams of M terminals, wherein M is an integer greater than or equal to 2 and less than or equal to N;
wherein the channel signal combination is predefined, or determined by the network side device and indicated to the terminal, or determined by the terminal and fed back to the network side device.

17. A network side device, comprising: a memory, a processor, a transceiver, and a program stored in the memory and executed by the processor; wherein, the processor executes the program to implement the beam indication method according to claim 16.

18. A first terminal, comprising: a memory, a processor, a transceiver, and a program stored on the memory and executed by the processor; wherein, the processor executes the program to implement the following steps:

receiving a first message, wherein the first message includes beam-related information for indicating N beams, N is an integer greater than or equal to 1;

transmitting at least two target channels and/or target reference signals according to the beam-related information;

wherein the N beams are:

beams for each of N channel signal combinations, each channel signal combination includes at least two channels and/or reference signals; or beams of M terminals, wherein M is an integer greater than or equal to 2 and less than or equal to N;

wherein the channel signal combination is predefined, or determined by the network side device and indicated to the terminal, or determined by the terminal and fed back to the network side device.

* * * * *